(12) United States Patent
Sanchez et al.

(10) Patent No.: US 10,664,822 B2
(45) Date of Patent: May 26, 2020

(54) SYSTEMS AND METHODS FOR FACILITATING BILL PAYMENT FUNCTIONALITY IN MOBILE COMMERCE

(71) Applicant: FIRST DATA CORPORATION, Greenwood Village, CO (US)

(72) Inventors: J. Scott Sanchez, Atlanta, GA (US); Vijay Kumar Royyuru, Norristown, PA (US); Brent Dewayne Adkisson, Omaha, NE (US); Jerome Wendell Myers, Douglasville, GA (US)

(73) Assignee: FIRST DATA CORPORATION, Atlanta, GA (US)

( * ) Notice: Subject to any disclaimer, the term of this patent is extended or adjusted under 35 U.S.C. 154(b) by 144 days.

(21) Appl. No.: 14/024,274

(22) Filed: Sep. 11, 2013

(65) Prior Publication Data

US 2014/0100931 A1    Apr. 10, 2014

Related U.S. Application Data

(60) Provisional application No. 61/699,728, filed on Sep. 11, 2012, provisional application No. 61/799,676, filed on Mar. 15, 2013.

(51) Int. Cl.
*G06F 3/048*     (2013.01)
*G06Q 20/32*    (2012.01)
(Continued)

(52) U.S. Cl.
CPC ......... *G06Q 20/3223* (2013.01); *G06Q 20/02* (2013.01); *G06Q 20/102* (2013.01);
(Continued)

(58) Field of Classification Search
None
See application file for complete search history.

(56) References Cited

U.S. PATENT DOCUMENTS 8,498,900 B1 *  7/2013  Spirin ................... G06Q 50/00
                                                        340/286.09
8,799,083 B1 *  8/2014  Silver ................... G06Q 10/02
                                                        235/379

(Continued)

*Primary Examiner* — William J Jacob
(74) *Attorney, Agent, or Firm* — Eversheds Sutherland (US) LLP

(57) ABSTRACT

Provided are systems and methods for facilitating bill payment functionality in mobile commerce. In one embodiment, a method can include receiving a transaction code at the mobile device, transmitting the transaction code to a merchant device for association with a transaction, receiving transaction information associated with a transaction based on the transaction code at the mobile device, displaying the transaction information at the mobile device; displaying at least one payment option at the mobile device, receiving a selection of one of the at least one payment option; transmitting the selected payment option and transaction information from the mobile device for approval of the payment of the transaction, receiving notification of approval of the payment at the mobile device, and receiving a payment completion code associated with the notification of approval, wherein the payment completion code is provided to the consumer on a bill associated with the transaction.

17 Claims, 15 Drawing Sheets

(51) Int. Cl.
*G06Q 20/40* (2012.01)
*G06Q 20/24* (2012.01)
*G06Q 20/42* (2012.01)
*G06Q 30/02* (2012.01)
*G06Q 30/06* (2012.01)
*G06Q 20/10* (2012.01)
*G06Q 20/02* (2012.01)
*G06Q 20/20* (2012.01)
*H04L 29/06* (2006.01)
*G06Q 40/02* (2012.01)
*B60S 3/00* (2006.01)

(52) U.S. Cl.
CPC ........... *G06Q 20/204* (2013.01); *G06Q 20/24* (2013.01); *G06Q 20/3224* (2013.01); *G06Q 20/3276* (2013.01); *G06Q 20/3278* (2013.01); *G06Q 20/40* (2013.01); *G06Q 20/4037* (2013.01); *G06Q 20/42* (2013.01); *G06Q 30/0222* (2013.01); *G06Q 30/0233* (2013.01); *G06Q 30/0267* (2013.01); *G06Q 30/0625* (2013.01); *G06Q 30/0633* (2013.01); *G06Q 40/025* (2013.01); *H04L 63/083* (2013.01); *B60S 3/00* (2013.01)

(56) References Cited

U.S. PATENT DOCUMENTS

| | | | | |
|---|---|---|---|---|
| 9,830,595 | B2* | 11/2017 | Anderson | G06Q 20/3821 |
| 2007/0205275 | A1* | 9/2007 | Nicola | G06Q 20/327 |
| | | | | 235/383 |
| 2009/0037286 | A1* | 2/2009 | Foster | G06Q 20/20 |
| | | | | 705/21 |
| 2009/0288012 | A1* | 11/2009 | Hertel | G06Q 20/02 |
| | | | | 715/738 |
| 2011/0029416 | A1* | 2/2011 | Greenspan | G06Q 20/10 |
| | | | | 705/30 |
| 2011/0251892 | A1* | 10/2011 | Laracey | G06Q 30/0253 |
| | | | | 705/14.51 |
| 2012/0150673 | A1* | 6/2012 | Hart | G06Q 20/204 |
| | | | | 705/17 |
| 2012/0166332 | A1* | 6/2012 | Naaman | G06Q 20/102 |
| | | | | 705/40 |
| 2012/0185355 | A1* | 7/2012 | Kilroy | G06Q 30/0633 |
| | | | | 705/26.8 |
| 2012/0214416 | A1* | 8/2012 | Kent | H04L 63/18 |
| | | | | 455/41.2 |
| 2013/0006782 | A1* | 1/2013 | Schwarzkopf | G06Q 30/04 |
| | | | | 705/17 |
| 2013/0066750 | A1* | 3/2013 | Siddique | G06Q 10/0637 |
| | | | | 705/27.2 |
| 2013/0080239 | A1* | 3/2013 | Okerlund | G06Q 30/0226 |
| | | | | 705/14.33 |
| 2013/0138518 | A1* | 5/2013 | White | G06Q 20/204 |
| | | | | 705/16 |
| 2013/0151417 | A1* | 6/2013 | Gupta | G06Q 20/382 |
| | | | | 705/65 |
| 2013/0159178 | A1* | 6/2013 | Colon | G06Q 20/36 |
| | | | | 705/41 |
| 2013/0215116 | A1* | 8/2013 | Siddique | G06Q 30/0643 |
| | | | | 345/420 |
| 2013/0339253 | A1* | 12/2013 | Sincai | G06Q 20/3227 |
| | | | | 705/71 |
| 2013/0346302 | A1* | 12/2013 | Purves | G06Q 20/102 |
| | | | | 705/40 |
| 2014/0052617 | A1* | 2/2014 | Chawla | G06Q 10/10 |
| | | | | 705/39 |
| 2014/0195318 | A1* | 7/2014 | Pointer | G06Q 30/0207 |
| | | | | 705/14.17 |
| 2014/0214652 | A1* | 7/2014 | Zheng | G06Q 20/227 |
| | | | | 705/39 |
| 2015/0154597 | A1* | 6/2015 | Bacastow | G06Q 20/4012 |
| | | | | 705/72 |
| 2015/0278773 | A1* | 10/2015 | Rolf | G06Q 20/02 |
| | | | | 705/39 |

* cited by examiner

SYSTEMS AND METHODS FOR FACILITATING BILL PAYMENT FUNCTIONALITY IN MOBILE COMMERCE

CROSS-REFERENCE TO RELATED APPLICATIONS

This application claims priority to U.S. Ser. No. 61/699,728, titled "Systems and Methods for Implementing Mobile Commerce," filed on Sep. 11, 2012, and to U.S. Ser. No. 61/799,676, titled "Systems and Methods for Implementing Mobile Commerce," filed on Mar. 15, 2013, the entire contents of both are hereby incorporated by reference.

FIELD OF THE DISCLOSURE

The disclosure generally relates to mobile commerce, and more particularly, to systems and methods for facilitating bill payment functionality in mobile commerce.

BACKGROUND OF THE INVENTION

Commercial transactions to purchase certain goods and services are being implemented by consumers using mobile devices, such as smartphones. However, many commercial transactions are still cumbersome to implement since many conventional point-of-sale (POS) terminals and devices, payment processing systems, and smartphone interfaces are not configured for user-friendly transactions.

BRIEF SUMMARY OF THE INVENTION

The disclosure relates to systems and methods for facilitating bill payment functionality in mobile commerce.

In one embodiment, a method for splitting a bill among consumers can be provided. The method can include receiving an indication from a consumer to split the bill among two or more consumers; receiving the bill to be split among two or more consumers; receiving inputs associated with a number of people to split the bill among, tip amount, and identifying other consumers and/or contact information for the other consumers; receiving payment instructions from the other consumers; based at least in part on the inputs and/or payment instructions, facilitate payment processing of the bill among the two or more consumers; providing payment confirmation requests and/or payment notifications to one or more of the consumers; and providing payment confirmation notifications to a merchant.

In another embodiment, a system for splitting a bill among consumers can be provided. The system can include at least one processor operable to execute computer-executable instructions. The system can also include at least one memory operable to store computer-executable instructions. The computer-executable instructions can be operable to receive an indication from a consumer to split the bill among two or more consumers; receive the bill to be split among two or more consumers; receive inputs associated with a number of people to split the bill among, tip amount, and identifying other consumers and/or contact information for other the consumers; receive payment instructions from the other consumers; based at least in part on the inputs and/or payment instructions, facilitate payment processing of the bill among the two or more consumers; provide payment confirmation requests and/or payment notifications to one or more of the consumers; and provide payment confirmation notifications to a merchant.

In yet another embodiment, a method for splitting a bill among consumers can be provided. The method can include receiving an indication from a consumer to split a bill among two or more consumers; receiving the bill to be split among the two or more consumers; providing a list of items from the bill to each of the consumers; receiving inputs from the consumers selecting one or more items to pay for; receiving payment instructions for the consumers selecting one or more items to pay for; calculating a total bill and/or tip for each consumer; receiving payment instructions from the consumers; facilitating payment processing of the bill among two or more consumers; providing payment confirmation requests and/or payment notifications to two or more consumers; and providing payment confirmation notification to the merchant.

In yet another embodiment, a system for splitting a bill among consumers can be provided. The system can include at least one processor operable to execute computer-executable instructions. The system can also include at least one memory operable to store computer-executable instructions. The computer-executable instructions can be operable to receive an indication from a consumer to split a bill among two or more consumers; receive the bill to be split among the two or more consumers; provide a list of items from the bill to each of the consumers; receive inputs from the consumers selecting one or more items to pay for; receive payment instructions for the consumers selecting one or more items to pay for; calculate a total bill and/or tip for each consumer; receive payment instructions from the consumers; facilitating payment processing of the bill among two or more consumers; provide payment confirmation requests and/or payment notifications to two or more consumers; and provide payment confirmation notification to the merchant.

In another embodiment, a method for splitting a bill among consumers can be provided. The method can include receiving an indication from a consumer to split a bill among two or more consumers; transmitting a bill to a split-the-bill application program; receiving notification concerning unpaid amounts and/or items, and/or payment disputes by one or more consumers; and receiving payment confirmation of the bill from the split-the-bill application program.

In another embodiment, a system for splitting a bill among consumers can be provided. The system can include at least one processor operable to execute computer-executable instructions. The system can also include at least one memory operable to store computer-executable instructions. The computer-executable instructions can be operable to receive an indication from a consumer to split a bill among two or more consumers; transmit a bill to a split-the-bill application program; receive notification concerning unpaid amounts and/or items, and/or payment disputes by one or more consumers; and receive payment confirmation of the bill from the split-the-bill application program.

In yet another embodiment, a method for code-based payment from a consumer's mobile device can be provided. The method can include receiving a transaction code at the mobile device; transmitting the transaction code to a merchant device for association with a transaction; receiving transaction information associated with a transaction based on the transaction code at the mobile device; displaying the transaction information at the mobile device; displaying at least one payment option for selection at the mobile device, wherein each payment option is configured to facilitate a payment of the transaction; receiving a selection of one of the at least one payment option; transmitting the selected payment option and transaction information from the mobile device for approval of the payment of the transaction;

receiving notification of approval of the payment at the mobile device; and receiving a payment completion code associated with the notification of approval, wherein the payment completion code is configured to be provided to the consumer on a bill associated with the transaction.

In yet another embodiment, a system for code-based payment from a consumer's mobile device can be provided. The system can include at least one processor operable to execute computer-executable instructions. The system can also include at least one memory operable to store computer-executable instructions. The computer-executable instructions can be operable to receive a transaction code at the mobile device; direct communication of the transaction code to a merchant device for association with a transaction; receive transaction information associated with a transaction based on the transaction code at the mobile device; display the transaction information at the mobile device; display at least one payment option for selection at the mobile device, wherein each payment option is configured to facilitate a payment of the transaction; receive a selection of one of the at least one payment option; direct communication of the selected payment option and transaction information from the mobile device for approval of the payment of the transaction; receive notification of approval of the payment at the mobile device; and receive a payment completion code associated with the notification of approval, wherein the payment completion code is configured to be provided to the consumer on a bill associated with the transaction.

In another embodiment, a method for code-based payment from a consumer's mobile device can be provided. The method can include receiving a transaction code at the mobile device; transmitting the transaction code to a merchant device for association with a transaction; receiving transaction information associated with a transaction based on the transaction code at the mobile device, wherein the transaction information comprises a bill amount; displaying the transaction information at the mobile device; displaying at least one payment option for selection at the mobile device, wherein each payment option is configured to facilitate a payment of the transaction; receiving a selection of one of the at least one payment option; receiving a coupon for the transaction, the coupon comprising a reduction of a coupon amount; transmitting the selected payment option, transaction information, and the coupon from the mobile device for approval of the payment of the transaction; receiving notification of approval of the payment at the mobile device, wherein the bill amount is reduced by the coupon amount for the transaction; and receiving a payment completion code associated with the notification of approval, wherein the payment completion code is configured to be provided to the consumer on a bill associated with the transaction.

In another embodiment, a system for code-based payment from a consumer's mobile device can be provided. The system can include at least one processor operable to execute computer-executable instructions. The system can also include at least one memory operable to store computer-executable instructions. The computer-executable instructions can be operable to receive a transaction code at the mobile device; direct communication of the transaction code to a merchant device for association with a transaction; receive transaction information associated with a transaction based on the transaction code at the mobile device, wherein the transaction information comprises a bill amount; display the transaction information at the mobile device; display at least one payment option for selection at the mobile device, wherein each payment option is configured to facilitate a payment of the transaction; receive a selection of one of the at least one payment option; receive a coupon for the transaction, the coupon comprising a reduction of a coupon amount; direct communication of the selected payment option, transaction information, and the coupon from the mobile device for approval of the payment of the transaction; receive notification of approval of the payment at the mobile device, wherein the bill amount is reduced by the coupon amount for the transaction; and receive a payment completion code associated with the notification of approval, wherein the payment completion code is configured to be provided to the consumer on a bill associated with the transaction.

In yet another embodiment, a method for a check in to pay at a quick service restaurant transaction can be provided. The method can include providing a mobile commerce program application to a consumer's mobile device; generating a consumer account based at least in part on personal and/or payment information associated with the consumer; receiving an indication the consumer is visiting a merchant location to purchase a good and/or service; identifying the consumer at the merchant location based at least in part on information received from the consumer's mobile device; outputting consumer information to a merchant computer system and/or merchant computer device, such as a POS device; associating the consumer with a merchant transaction; receiving consumer payment information and consumer confirmation of the transaction; and generating notification of the transaction and/or of any loyalty/reward credit for the activity.

In yet another embodiment, a system for a check in to pay at a quick service restaurant transaction can be provided. The system can include at least one processor operable to execute computer-executable instructions. The system can also include at least one memory operable to store computer-executable instructions. The computer-executable instructions can be operable to provide a mobile commerce program application to a consumer's mobile device; generate a consumer account based at least in part on personal and/or payment information associated with the consumer; receive an indication the consumer is visiting a merchant location to purchase a good and/or service; identify the consumer at the merchant location based at least in part on information received from the consumer's mobile device; output consumer information to a merchant computer system and/or merchant computer device, such as a POS device; associate the consumer with a merchant transaction; receive consumer payment information and consumer confirmation of the transaction; and generate notification of the transaction and/or of any loyalty/reward credit for the activity.

In another embodiment, a method for check in to pay in a quick service restaurant transaction can be provided. The method can include providing a mobile commerce program application to a consumer's mobile device; generating a consumer account based at least in part on personal and/or payment information associated with the consumer; receiving an indication the consumer is visiting a merchant location to purchase a good and/or service; providing a transaction number or code to the consumer; identifying the consumer at the merchant location based at least in part on information received from the consumer's mobile device; receiving the transaction number or code from the consumer; receiving the consumer payment information and consumer confirmation of the transaction; and generating a consumer notification of the transaction and/or of any loyalty/reward credit for the activity.

In another embodiment, a system for check in to pay in a quick service restaurant transaction can be provided. The system can include at least one processor operable to execute computer-executable instructions. The system can also include at least one memory operable to store computer-executable instructions. The computer-executable instructions can be operable to provide a mobile commerce program application to a consumer's mobile device; generate a consumer account based at least in part on personal and/or payment information associated with the consumer; receive an indication the consumer is visiting a merchant location to purchase a good and/or service; provide a transaction number or code to the consumer; identify the consumer at the merchant location based at least in part on information received from the consumer's mobile device; receive the transaction number or code from the consumer; receive the consumer payment information and consumer confirmation of the transaction; and generate a consumer notification of the transaction and/or of any loyalty/reward credit for the activity.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION OF THE INVENTION

Figure 1:
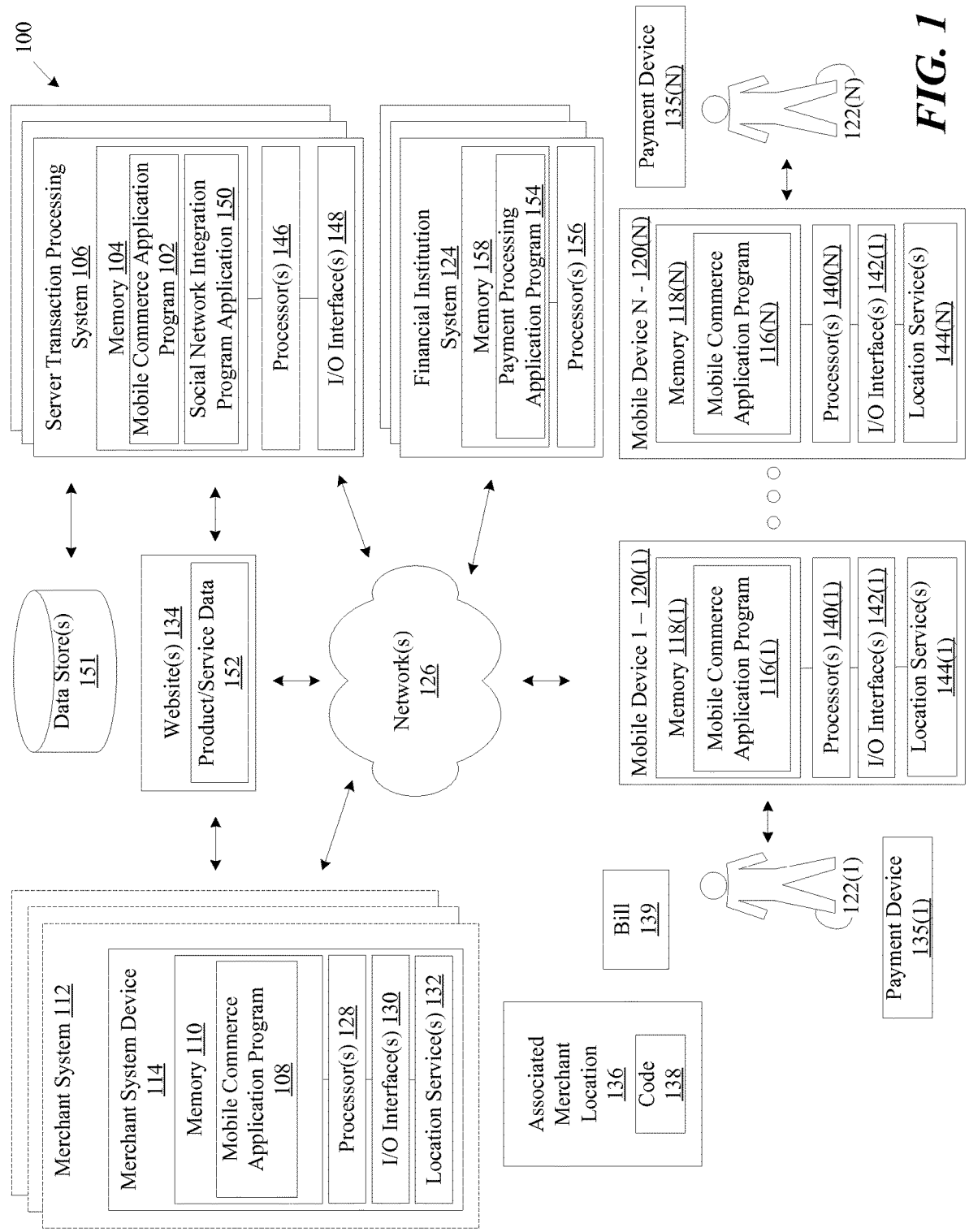
FIG. 1 illustrates an example system for facilitating bill payment functionality in mobile commerce according to certain embodiments of the disclosure.

Certain embodiments of the disclosure will now be described more fully hereinafter with accompanying drawings and corresponding description in FIGS. 1-16. This disclosure may, however, be embodied in many different forms and should not be construed as limited to the embodiments set forth herein.

Overview

The disclosure relates to systems and methods for facilitating bill payment functionality in mobile commerce. In one implementation, a mobile commerce application program, also known as a mobile wallet or wallet app, can be downloaded or otherwise implemented by a consumer and/or merchant via a mobile device or client device, such as a smartphone, cellphone, wearable computer, or tablet computer. The mobile commerce application program can integrate both payment and loyalty functionality for use by merchants and consumers to facilitate payment and/or loyalty/reward transactions for goods and/or services, administer loyalty/reward programs, and receive loyalty/reward credit for a variety of activities, including, for instance, visiting certain merchants during certain days and/or times as well as purchasing goods and/or services. For example, according to certain embodiments of the disclosure, a consumer can download a wallet app to his or her smartphone or other mobile device, input and store payment device information in the wallet app, and then use the wallet app to pay a merchant for a movie ticket by transmitting an indication from the smartphone or other mobile device to the merchant. Using the payment device information, loyalty/reward credit can be generated by the merchant and credited to the consumer via a loyalty/reward program account for visiting the movie theater during an off-peak date/time as well as purchasing the movie ticket. The wallet app can generate an output via the consumer's smartphone or mobile device to reflect the loyalty/reward credit to the consumer's associated loyalty/reward program account as well as an electronic receipt for the consumer's movie ticket purchase. In this manner, loyalty/reward programs can become easier to use for consumers since the mobile commerce application can electronically track credits and various activities by the consumer can earn the consumer additional loyalty/reward credits. Further, different types of consumer loyalty can be rewarded, such as based on visits, spending, performing any number of activities (e.g., sending a friend an email or text, joining a loyalty/reward program, trying something new or different, etc.), or for ad-hoc reasons (e.g., late merchant service).

In another implementation, one or more tools can be provided by a mobile commerce application program to merchants and consumers to build closer ties between them or otherwise connect them through increased and more focused communications. For example, according to certain embodiments of the disclosure, a restaurant merchant can access, via a point of sale (POS) device or client device, a customized mobile commerce application or wallet app that has been downloaded to a consumer's mobile device or client device. When the restaurant merchant wants to communicate with its customers about news, upcoming events, and new menu items, such as announcing a special wine and cheese event for frequent customers. The restaurant merchant can access one or more tools to send notifications or messages to certain selected consumers via the wallet app on consumer's mobile devices or client devices. The tools can facilitate access to demographic and consumer data (spending, visits, etc.); filter data based on the demographic data, consumer data, and demographic and/or consumer groups; manage communication preferences (email, texts, notifications, etc.); and apply consumer preferences to selected communications Consumers could be selected based on, for instance, the number of restaurant visits in the past 30 days. In this manner, the merchant can target certain groups of consumers with focused messages and marketing campaigns, and thereby increase or otherwise improve merchant-consumer contact.

In yet another implementation, a mobile commerce application program can provide customized merchant applications to different merchants. For example, a local restaurant merchant may want to customize a wallet app or mobile commerce application program for downloading to or otherwise accessing via a consumer's mobile device or client device. The merchant can access another mobile commerce application program and utilize one or more tools to, for example, upload a merchant business logo, select parameters for a loyalty/reward program, and select data fields for obtaining consumer information or asking consumer questions. In any instance, after the merchant has customized a wallet app, consumers can access or otherwise download the app to their respective mobile devices or client devices, and initiate communications with the merchant via the customized wallet app. In certain other embodiments, a multi-merchant app can be provided to consumers for download to or access by a mobile device or client device. In that instance, consumers can have the ability to select from a list of merchants that communicate via the multi-merchant app. In certain other embodiments, a mobile commerce application program can provide services to any number of merchants who may have their own respective apps, and the mobile commerce application program can provide a variety of payment, communication, advertising, and loyalty/reward services through, for example, one or more application plug-ins that can interface between the merchant apps and the mobile commerce application program. In this manner, a merchant can customize consumers' payment and/or loyalty/rewards experiences through a wallet app or mobile commerce application program.

In the above implementations and other embodiments described herein, a mobile commerce application program, sometimes referred to as a wallet app, can be hosted or otherwise stored on a mobile device, client device, server device, or any other processor-based device. Multiple instances of mobile commerce application programs can operate within a network environment, such as described in FIG. 1, and each may have similar or different functionality, such as described in FIG. 2, according to various embodiments and implementations as described herein.

Certain Example Implementations and Embodiments

An example architecture or environment for a system 100 according to various embodiments of the disclosure is shown in and described with respect to FIG. 1. A mobile commerce application program or module, such as mobile commerce application program or module 102, can be stored in memory 104 at a server device 106. In certain embodiments, a mobile commerce application program or module, such as mobile commerce application program or module 108, can be stored in memory 110 at a merchant system computer 112 or associated merchant device 114. In certain embodiments, a mobile commerce application program or module, such as mobile commerce application program or module 116(1), can be stored in memory 118(1) at a mobile device 120(1) associated with a consumer 122(1) or user. In any instance, one or more mobile commerce application programs or modules operating on respective computers, servers and/or mobile devices can implement some or all of the functionality described herein.

As shown in FIG. 1, the system 100 may include or otherwise support one or more merchant system computers 112 and/or associated merchant devices 114, one or more consumer or mobile devices 120(1)-120(N), one or more server transaction processing systems 106, and one or more issuer or financial institution systems 124. A wide variety of different types of consumer or mobile devices 120(1)-120(N) may be provided or otherwise supported, such as consumer computers and/or mobile communication devices. As desired, the system 100 may provide or otherwise support a wide variety of other entities associated with payment transactions, such as one or more server transaction processing systems 106. Any number of suitable networks and/or communication channels, such as the illustrated networks 126, may facilitate communication between various components of the system 100.

With reference to FIG. 1, any number of merchant system computers 112 and/or associated merchant devices 114 may be provided or otherwise supported. In certain embodiments, these merchant system computers 112 and/or associated merchant devices 114 may include one or more point-of-sale (POS) devices or terminals. As desired, each merchant system computer 112 and/or associated merchant device 114 may include any number of processor-driven devices, including but not limited to, a server computer, a mainframe computer, one or more networked computers, a desktop computer, a personal computer, a laptop computer, a mobile computer, a smartphone, a tablet computer, a wearable computer device, an application-specific circuit, or any other processor-based device.

A merchant system computer 112 and/or associated merchant device 114 may be any suitable device that facilitates purchase transactions, such as those in retail establishments, e-commerce and/or mobile transactions. In operation, the merchant system computer 112 and/or associated merchant device 114 may utilize one or more processors 128 to execute computer-readable instructions that facilitate the hosting of one or more mobile commerce application program services, the receipt of purchase transaction requests, and/or the processing of payment and/or loyalty/reward transactions. As a result of executing these computer-readable instructions, a special purpose computer or particular machine may be formed that facilitates the purchase and/or loyalty/reward transactions.

In addition to having one or more processors 128, the merchant system computer 112 and/or associated merchant device 114 may further include and/or be associated with one or more memory devices 110, input/output ("I/O") interface(s) 130, network interface(s), and/or location services 132. The memory 110 may be any computer-readable medium, coupled to the processor(s) 128, such as random access memory ("RAM"), read-only memory ("ROM"), and/or removable storage devices. The memory 110 may store a wide variety of data files and/or various program modules, such as an operating system ("OS"), one or more host modules, and/or one or more transaction modules or transaction applications, such as mobile commerce application program 108. The data files may include any suitable data that facilitates the operation of the merchant system computer 112 and/or associated merchant device 114, and/or interaction of the merchant system computer 112 and/or associated merchant device 114 with one or more other components (e.g., one or more consumer or mobile devices 120(1)-120(N), one or more server transaction processing systems 106, one or more merchant acquiring platforms, one or more issuer systems, one or more financial institution systems 124, etc.) of the system 100. For example, the data files may include information associated with one or more websites 134 (hosted by either a third party and/or merchant), webpages, inventory information associated with available products, acquiring platform information, service provider information, information associated with the generation of payment and/or loyalty/reward transactions and/or routing information for payment and/or loyalty/reward transactions.

The OS may be any suitable module that facilitates the general operation of the merchant system computer, as well as the execution of other program modules. For example, the OS may be, but is not limited to, Microsoft Windows®, Apple OSX™, Unix, a mainframe computer operating system (e.g., IBM z/OS, MVS, OS/390, etc.), or a specially designed operating system. The host modules may include any number of suitable host modules that manage interactions and communications between the merchant system computer 112 and/or associated merchant device 114, and external devices, such as the consumer or mobile devices 120(1)-120(N). For example, the host modules may include one or more Web server modules that facilitate the hosting of merchant websites and/or third party websites, such as the one or more websites 134, webpages, and/or transaction processing webpages. As another example, the host modules may include one or more cellular modules and/or systems that facilitate cellular communication with one or more mobile devices 120(1)-120(N).

The transaction modules or applications, such as the mobile commerce application program 108, may include any number of suitable software modules and/or applications that facilitate the collection and/or processing of information association with a purchase transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer or mobile device 120(1)-120(N) (e.g., a mobile device identifier, etc.). Based at least in part upon the collected information, the transaction modules or applications may generate and/or communicate a wide variety of transaction-related requests, such as payment processing and/or authorization requests and/or requests for one or more value added services ("VAS").

In one example embodiment, a transaction module, such as the mobile commerce application program 108, may receive a request for a purchase and/or loyalty/reward transaction (e.g., a request provided via a web page, etc.). As desired, the transaction module may identify available payment options that are presented to a consumer (e.g., credit account payment options, debit account payment options, stored value account payment options, card present e-commerce payment options, etc.), and a consumer selection of a payment option may be received. In the event that a card present transaction is requested, the transaction module may obtain a mobile device identifier, for example, via an established communications session with a consumer's mobile device or in response to requesting the mobile device identifier from the consumer. The transaction module may then invoke or request that a server transaction processing system 106 invoke one or more suitable applications on the mobile device, such as the mobile device 120(1), (e.g., a wallet application, a mobile commerce application program, a transaction module, etc.) in order to receive validation information from the mobile device 120(1), such as an mPIN and/or a message (e.g., an encrypted message, etc.) derived from an mPIN and/or other information (e.g., a secure element identifier, an encryption key, etc.). The transaction module (or server transaction processing system) may then associate the validation information with a proposed transaction that is output for communication to an issuer system or financial institution system 124 associated with a selected payment account. For example, the transaction module may append and/or incorporate the validation information into a transaction authorization and/or settlement request. In this regard, the issuer system or financial institution system 124 may verify the validation information and determine whether a card present e-commerce transaction will be allowed.

As desired, prior to the output of a proposed transaction, the transaction module may invoke and/or request (e.g., request a server transaction processing system, etc.) the invocation of a wide variety of VAS associated with a transaction, such as the application of coupons, the award and/or redemption of loyalty rewards, etc. Additionally, in the event that the transaction is authorized, the transaction module may invoke and/or request the invocation of a wide variety of VAS following the transaction, such as receipt delivery services, product registration services, etc. Indeed, a wide variety of suitable operations may be performed by the transaction module.

Similarly, in some embodiments, a payment device, such as payment devices 135(1)-135(N), for example a payment card, credit card, debit card, stored value card, smart card, etc., may be associated with a respective consumer, such as consumers 122(1)-122(N). The payment device, such as the payment device 135(1), can be used to request a purchase and/or loyalty/reward transaction when presented to a merchant system computer 112 and/or merchant computer device 114, either directly by the consumer 122(1) or via a consumer's mobile device, such as the mobile devices 120(1)-120(N). In these instances, an associated transaction module, such as the mobile commerce application program 108 associated with the merchant computer system 112 and/or merchant computer device 114, can receive payment device information, such as an account number and/or other payment device information, and communicate, via one or more networks 126, some or all of the payment device information to an issuer system or financial institution system 124 with the proposed transaction information for processing.

Example application programs or modules associated with the operations that may be performed by a transaction module or mobile commerce application program 108 and/or the merchant system computer 112 and/or associated merchant device 114 are described in greater detail below with reference to FIG. 2.

With continued reference to the merchant system computer 112 and/or associated merchant device 114, the one or more I/O interfaces 130 may facilitate communication between the merchant system computer 112 and/or associated merchant device 114 and one or more input/output devices; for example, one or more user interface devices, such as a display, a keypad, a mouse, a pointing device, a gesture detection device, an eye movement detection device, a control panel, a touch screen display, a remote control, a microphone, a speaker, a consumer device reader, etc., that facilitate user interaction with the merchant system computer 112 and/or associated merchant device 114. The one or more network interfaces may facilitate connection of the merchant system computer 112 and/or associated merchant device 114 to one or more suitable networks, such as one or more networks 126, and/or communication links. In this regard, the merchant system computer 112 and/or associated merchant device 114 may receive and/or communicate information to other components of the system 100, such as the consumer or mobile devices, for example 120(1)-120(N), the server transaction processing systems 106, and/or the issuer or financial institution systems 124.

In certain embodiments, a merchant computer system 112 and/or associated merchant computer device 114 can be associated with a merchant location 136, such as a retail store or "bricks and mortar"-type establishment. The merchant location 136 may include a code 138, such as a QR code, bar code, or other machine readable code, wherein consumers can utilize a respective consumer or mobile device to scan or read the code to obtain information associated with a merchant, such as a merchant loyalty/rewards program.

In certain embodiments, a bill 139 can be generated by a merchant computer system 112 and/or merchant system device 114 and transmitted to a consumer's mobile device, such as the mobile device 120(1). The bill can include bill information, such as a merchant name, merchant account number or code, list of goods sold, list of services rendered, an itemized amount for a good and/or service, service charge or tip, a suggested service charge or tip, and a total amount.

Additionally, with continued reference to FIG. 1, any number of consumer or mobile devices 120(1)-120(N) may be provided or otherwise supported. Examples of suitable consumer or mobile devices can include, but are not limited to, personal computers and/or mobile communication devices (e.g., mobile phones, smart phones, wearable devices, etc.), etc. According to an aspect of the disclosure, a consumer or mobile device, such as the mobile device 120(1) may be a suitable device that is capable of interaction with other components of the system 100 during the request and/or completion of an e-commerce transaction. For example, a personal computer or mobile device may be utilized to access one or more e-commerce websites, such as the one or more websites 134, including those hosted by the merchant system computer, such as the merchant system computer 112, identify products and/or services to be purchased, request a purchase and/or loyalty/reward transaction, and/or interact with the merchant system computer 112, merchant system device 114, and/or other components of the system 100 (e.g., the server transaction processing system 106, etc.) during the completion of a payment and/or loyalty/reward transaction. In one example embodiment, a mobile device, such as the mobile device 120(1), may be utilized to request a payment and/or loyalty/reward transaction and/or to provide validation information during the processing of the payment and/or loyalty/reward transaction. In another example embodiment, a personal computer may be utilized to request a payment and/or loyalty/reward transaction, and communication may be established with a mobile device, such as the mobile device 120(1), in order to facilitate provision of validation information.

As desired, a consumer or mobile device, such as the mobile device 120(1), may be any number of processor-driven devices, including but not limited to, a personal computer, a mobile computer, an application-specific circuit, a minicomputer, a microcontroller, and/or any other processor-based device. The components of an example mobile device, such as the mobile device 120(1), will now be described in greater detail, and it will be appreciated that a personal computer may include similar components. With reference to the mobile device 120(1), the mobile device 120(1) may utilize one or more processors 140(1) to execute computer-readable instructions that facilitate the general operation of the mobile device 120(1) (e.g., call functionality, etc.) and/or communication with a merchant system computer 112, merchant system device 114, and/or other components of the system 100 (e.g., the server transaction processing system 106) for payment and/or loyalty/reward transaction purposes. As a result of executing these computer-readable instructions, a special purpose computer or particular machine may be formed that facilitates the completion of payment and/or loyalty/reward transactions.

In addition to having one or more processors, the mobile device, such as the mobile devices 120(1)-120(N), may further include and/or be associated with one or more memory devices 118(1)-118(N), input/output ("I/O") interface(s) 142(1)-142(N), network interface(s), and/or location services 144(1)-144(N). The memory 118(1)-118(N) may be any computer-readable medium, coupled to the processor(s) 140(1)-140(N), such as random access memory ("RAM"), read-only memory ("ROM"), and/or removable storage devices. The memory 118(1)-118(N) may store a wide variety of data files and/or various program modules, such as an operating system ("OS") and/or one or more transaction modules or applications, such as a mobile commerce application program 116(1)-116(N). In certain embodiments, a mobile device, such as the mobile device 120(1), may include one or more secure elements configured to securely store and/or access information, such as payment applications, payment account information, validation information (e.g., a stored mPIN, etc.), encryption information, and/or other transaction-related information. The secure elements may be stored in the memory 118(1) and/or included as a separate component of the mobile device 120(1). For example, a secure element may be a separate chip that is configured to communicate with primary computing functionality for the mobile device. As desired, one or more of the transaction modules, such as the mobile commerce application program 116(1), may be stored on a secure element. The transaction modules may be invoked by other components of the mobile device 120(1) and/or by one or more other components of the system 100, such as the merchant system computer 112, merchant system device 114, and/or the server transaction processing system 106.

The data files may include any suitable data that facilitates the operation of the mobile device, such as the mobile device 120(1), and/or interaction of the mobile device 120(1) with one or more other components (e.g., a merchant system computer 112, merchant system device 114, a server transaction processing system 106, etc.) of the system 100. For example, the data files may include information associated with accessing the secure elements, information associated with invoking transaction modules, and/or information associated with accessing and/or processing validation data (e.g., an mPIN, etc.). The OS may be a suitable module that facilitates the general operation of the mobile device, such as the mobile device 120(1), as well as the execution of other program modules. For example, the OS may be, but is not limited to, a suitable mobile OS or a specially designed operating system. As desired, the mobile device 120(1) may also include one or more suitable browser applications that facilitate the access of one or more webpages hosted by the merchant system computer 112, and/or third party or merchant websites, such as the one or more websites 134.

The transaction modules may include one or more suitable software modules and/or applications configured to facilitate purchase transactions, such as payment and/or loyalty/reward transactions, on behalf of the mobile device, such as the mobile device 120(1). In certain embodiments, a transaction module or mobile commerce application program, such as the mobile commerce application program 116(1), may also facilitate communication with a server transaction processing system, such as the server transaction processing system 106, or a trusted service manager. A wide variety of suitable techniques may be utilized to install a transaction module on the mobile device, such as mobile device 120(1). For example, a transaction module may be provisioned to the mobile device 120(1) by a server transaction processing system 106 and/or by an issuer or financial institution system 124. Additionally, during the installation and/or registration of the transaction module, a wide variety of validation information may be generated and/or identified. For example, a consumer, such as the consumer 122(1) may be prompted to enter an mPIN, such as a multi-character and/or multi-numeral code, to an associated mobile device, such as the mobile device 120(1). As desired, the mPIN may be stored on a secure element. Additionally, the mPIN and/or a wide variety of information derived from the mPIN (e.g., an encrypted mPIN, etc.) may be provided to one or more issuer or financial institution systems, such as the issuer or financial institution system 124, or an issuer system associated with an issuer of a payment account (e.g., a credit account, a debit account, a stored value account, etc.) that is associated with the transaction module.

According to an aspect of the disclosure, following registration and/or activation of the transaction module, the transaction module may be invoked during a payment and/or loyalty/reward transaction. For example, the transaction module may be invoked by a merchant system computer 112, merchant system device 114, or by a server transaction processing system 106 at the request of the merchant system computer 112 and/or merchant system device 114. In certain embodiments, the transaction module may be invoked following a consumer request to conduct a payment and/or loyalty/reward transaction and the identification of the mobile device, such as the mobile device 120(1), by the merchant system computer 112, merchant system device 114, or server transaction processing system 106. Following the invocation of the transaction module, a request for validation data and/or payment and/or loyalty/reward account data may be received. As desired, the transaction module may prompt the consumer for entry of an mPIN, and an mPIN value entered by the consumer, such as the consumer 122(1), (e.g., by a keypad, touchscreen, etc.) may be identified. A stored mPIN value may then be accessed from the secure element and compared to the entered mPIN value. In this regard, the entered mPIN value may be authenticated. If the entered mPIN value is not authenticated, then the transaction module may reject a proposed transaction and direct the output of a suitable error message.

If, however, the entered mPIN value is authenticated, then the transaction module may provide payment account data and associated validation data to the merchant system computer 112, merchant system device 114, or server transaction processing system 106. A wide variety of different types of validation data may be provided as desired in various embodiments, including but not limited to, an mPIN entered by the consumer 122(1), an indication that the entered mPIN was authenticated by the mobile device 120(1) and/or the secure element, an encrypted version of the entered mPIN, and/or an encrypted version of the stored mPIN. In one example embodiment, an entered mPIN may be authenticated, encrypted, and provided to the merchant system computer (or a server transaction processing system). In this regard, the encrypted mPIN may be provided to the issuer or financial institution system, such as the issuer or financial institution system 124, for authentication and/or risk analysis purposes.

Examples of the operations of the transaction module and/or the mobile device are described in greater detail below with reference to the other figures.

The one or more I/O interfaces, such as one or more I/O interfaces 142(1)-142(N), may facilitate communication between the mobile device, such as the mobile device 120(1) and one or more input/output devices; for example, one or more user interface devices, such as a display, a keypad, a touch screen display, a microphone, a speaker, etc., that facilitate user interaction with the mobile device 120(1). Further, the one or more network interfaces may facilitate connection of the mobile device, such as the mobile device 120(1), to one or more suitable networks, for example, the network(s) 126 illustrated in FIG. 1. In this regard, the mobile device, such as the mobile device 120(1), may receive and/or communicate information to other components of the system 100.

With continued reference to FIG. 1, as desired in various embodiments, any number of server transaction processing systems, such as the server device 106, may be provided or otherwise supported. A server transaction processing system 106 may facilitate the backend processing of a purchase transaction, such as a payment and/or loyalty/reward transaction. In certain embodiments, an issuer system may include similar components as those discussed above for the merchant system computer 112 and/or merchant system device 114. For example, server transaction processing system 106 may include any number of processors 146, memories, I/O interfaces 148, and/or network interfaces. In certain embodiments, a server transaction processing system 106 can include one or more transaction modules, such as a mobile commerce application program 102 and/or a social network integration program application 150. In any instance, the transaction modules can facilitate communications and/or interactions with any number of consumer or mobile devices such as the mobile devices 120(1)-120(N), merchant computer systems such as the merchant system computer 112, merchant computer devices 114, data stores 151, third party websites such as the one or more websites 134, and financial institution systems such as the financial institution system 124. In certain embodiments, a service transaction processing system, such as the server transaction processing system 106, can host a social network integration program application, such as 150, configured to communicate via any number of social network services and/or websites to obtain information from the services and/or websites, for example, product and/or service data 152 on a third party or merchant website, such as the one or more websites 134.

Furthermore, as desired, a server transaction processing system, such as the server transaction processing system 106, may provide a wide variety of transaction module provisioning services. Additionally, a server transaction processing system, such as the server transaction processing system 106, may provide a wide variety of transaction-related and/or value added services ("VAS") in association with transactions, such as coupon redemption services, loyalty/reward services, location-based services, electronic receipt services, product registration services, warranty services, coupon issuance services, and/or the routing of a proposed transaction to an issuer for approval and/or settlement purposes. In certain embodiments, a server transaction processing system, such as the server transaction processing system 106, may include similar components as those discussed above for the merchant system computer, such as the merchant system computer 112, and/or merchant system device, such as the merchant system device 114. For example, a server transaction processing system, such as the server transaction processing system 106, may include any number of processors, memories, I/O interfaces, and/or network interfaces.

With continued reference to FIG. 1, as desired in various embodiments, any number of issuer or financial institution systems, such as the financial institution system 124, may be provided or otherwise supported. An issuer or financial institution system, such as the financial institution system 124, may facilitate the backend processing of a payment and/or loyalty/reward transaction, such as a payment for an e-commerce transaction. For example, an issuer or financial institution system, such as the financial institution system 124, may host a payment processing application program, such as payment processing application program 154, or module to facilitate the approval, authentication, and/or settlement of a payment transaction. In certain embodiments, a payment transaction may be routed to an issuer or financial institution system, such as the financial institution system 124, via a suitable transaction network (e.g., a debit network, a credit network, etc.), and the issuer or financial institution system, such as the financial institution system 124, may evaluate the payment transaction via the payment processing application program, such as the payment processing application program 154, or module. An approval or rejection of the payment transaction may then be output for communication to a merchant system computer, such as the merchant system computer 112, and/or merchant system device 114. The issuer or financial institution system, such as the financial institution system 124, may then facilitate the settlement of the payment transaction. In certain embodiments, an issuer or financial institution system, such as the financial institution system 124, may include similar components as those discussed above for the merchant system computer 112 and/or merchant system device 114. For example, an issuer or financial institution system, such as the financial institution system 124, may include any number of processors 156, memories 158, I/O interfaces 160, and/or network interfaces.

In certain embodiments of the disclosure, an issuer or financial institution system, such as the financial institution system 124, may receive validation information in association with a purchase and/or loyalty/reward transaction.

A wide variety of suitable networks, individually and/or collectively shown as 126 in FIG. 1, may be utilized in association with embodiments of the disclosure. Certain networks may facilitate use of a wide variety of e-commerce-related communication. For example, one or more telecommunication networks, cellular networks, wide area networks (e.g., the Internet), and/or other networks may be provided or otherwise supported. Other networks may facilitate communication of transaction-related communications. For example, one or more transaction networks, such as branded networks (e.g., a VISA network, etc.), debit and/or PIN networks, and/or a wide variety of other suitable transaction networks may facilitate communication of transaction-related communications, such as e-commerce transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Figure 2:
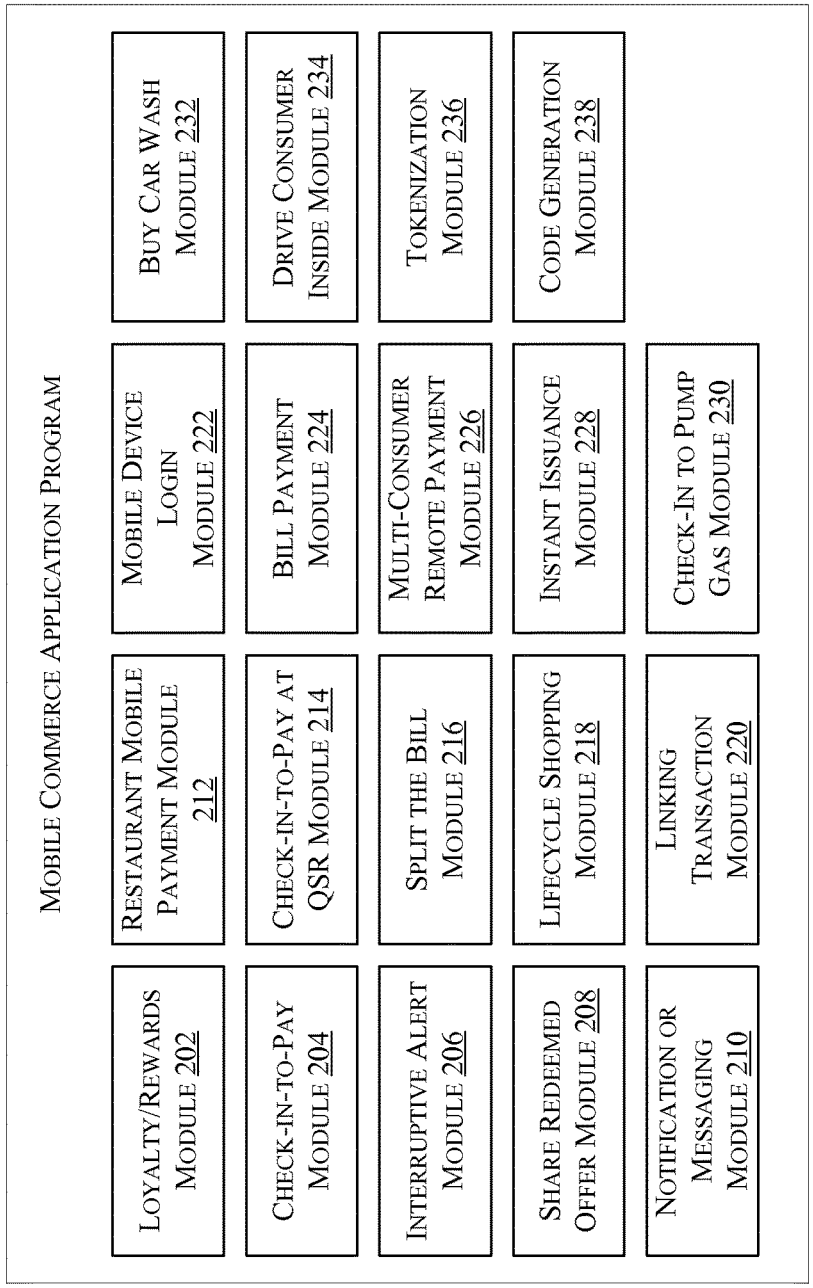
FIG. 2 illustrates an example mobile commerce program application or module according to certain embodiments of the disclosure.

FIG. 2 shows an example mobile commerce application program 200, similar to the mobile commerce application programs 102, 108, and 116(1)-116(N) in FIG. 1, that can operate with respect to the system 100 shown in FIG. 1. The mobile commerce application program 200 shown in FIG. 2 can include, for example, a loyalty/rewards module 202, a check-in-to-pay module 204, an interruptive alert module 206, a share redeemed offer module 208, a notification or messaging module 210, a restaurant mobile payment module 212, a check-in-to-pay at QSR module 214, a split the bill module 216, a lifecycle shopping module 218, a linking transaction module 220, a mobile device login module 222, a bill payment module 224, a multi-consumer remote payment module 226, an instant issuance module 228, a check-in to pump gas module 230, a buy car wash module 232, a drive consumer inside module 234, a tokenization module 236, and a code generation module 238. Some or all of the modules 202-238 are described herein with respect to certain mobile commerce functionality, associated processes, and features. FIGS. 3-15 illustrate certain processes associated with some or all of the modules comprising the example mobile commerce application program 200 in FIG. 2.

While the various modules 202-238 are shown by way of example, fewer or greater numbers of modules can be present in various embodiments of a mobile commerce application program. Furthermore, various functionality described with respect to one module may be performed by multiple modules in other embodiments of the disclosure.

Split the Bill

In some instances, consumers desire to pay a restaurant bill, and restaurants desire to settle their bills with consumers. Certain embodiments of the disclosure can provide systems and processes for paying a restaurant bill, such as permitting restaurants and consumers to quickly and easily "split the bill" among multiple consumers using one or respective mobile devices. For example, at the end of a meal, a restaurant bill, such as bill 139 in FIG. 1, can be generated and sent by a split the bill application program or mobile commerce application program, such as the mobile commerce application program or module 108, from a merchant computer system 112 and/or merchant computer device 114 associated with the restaurant to a mobile device, such as the mobile device 120(1), of a consumer, such as the consumer 122(1), in a group of consumers, such as consumers 122(1)-122(N). Using a mobile commerce program application, such as the mobile commerce application program 116(1), executing on the consumer's mobile device 120(1), the one consumer 122(1) can select how many people to divide the bill among, the amount of tip, and then identify the other consumers, either by phone number or email address, who will split the bill. The consumer's inputs can be processed by the mobile commerce program application 116(1) executing on the consumer's mobile device 120(1) and/or transmitted to the split the bill application program or mobile commerce application program 108 executing on the merchant computer system 112 and/or merchant computer device 114. In any instance, the split the bill application program or at least one mobile commerce application program 108, 116(1) can send various notifications to the various consumers 122(1)-122(N) via respective mobile devices 120(1)-120(N). Each of the respective consumers 122(1)-122(N) can receive the notifications and use a respective mobile commerce application program 116(N) executing on each consumer's mobile device 120(N) to select and input payment instructions. In some instances, consumers can provide payment instructions via their mobile devices 120(N) in response to the request for payment instructions, and the mobile devices 120(N) can transmit the payment instructions to the consumer's mobile device 120(1), the merchant computer system 112 and/or merchant computer device 114. In one embodiment, a split the bill application program or mobile commerce application program, such as the mobile commerce application program 116(1), can access a consumer's stored contacts, address book and/or stored phone numbers that may be stored locally on a mobile device 120(1) or client device, or stored on a device, such as a data store 151, host, or server device such as the server transaction processing system 106, accessible via at least one network such as the network(s) 126, to provide identification information (e.g., email address, name, phone number, mobile device number, etc.) for other consumers to split the bill with. In one embodiment, a split the bill application program or mobile commerce application program, such as the mobile commerce application program 116(1), can provide capability for each consumer to select the actual items ordered on the restaurant bill, provide a corresponding tip, and pay the consumer's respective actual share of the bill.

In one embodiment, by way of a mobile device, such as the mobile device 120(1), or other client device, such as a laptop computer or tablet, a consumer, such as the consumer 122(1), can initiate a split the bill feature in a payment application program, mobile commerce application program, such as the mobile commerce application program 116(1), or app accessible via the consumer's mobile device 120(1) or other client device. For example, in a payment application, mobile commerce application program, such as the mobile commerce application program 116(1), or app accessible via the consumer's mobile device 120(1) or other client device, a set of computer-executable instructions can be configured to receive an indication from a consumer 122(1) to split a restaurant bill, such as bill 139, and can be further configured to receive the restaurant bill from a split the bill application program or a mobile commerce application program, such as the mobile commerce application program or module 108, associated with a merchant computer system, such as the merchant system computer 112, and/or merchant computer device, such as the merchant system device 114. Based at least in part on inputs to the mobile commerce application program 116(1) executing on the consumer's mobile device 120(1) from the consumer regarding how many people to divide the bill 139 among, the amount of tip, and identifying the other consumers 122(N), either by phone number or email address, who will split the bill 139, the split the bill application program or a mobile commerce application program, such as the mobile commerce application program or module 108 or the mobile commerce application program 116(1), can generate and transmit various notifications to the various consumers 122(1)-122(N) via respective mobile devices 120(1)-120(N). The split the bill application program or a mobile commerce application program, such as the mobile commerce application program or module 108 or the mobile commerce application program 116(1), can receive payment instructions from the respective consumers 122(1)-122(N), and the split the bill application program or a mobile commerce application program, such as the mobile commerce application program or module 108 or the mobile commerce application program 116(1), can facilitate and/or process the respective payment instructions while confirming the entire amount of the bill 139 has been paid. In some embodiments, holds for authorization can be implemented as each consumer 122(1)-122(N) confirms and/or authorizes respective payments, and the restaurant confirms that the entire bill 139 has been paid for the group of consumers 122(1)-122(N). In any instance, the set of computer-executable instructions can be configured to transmit respective purchase or payment receipts to each of the consumers 122(1)-122(N).

In one embodiment, a split the bill application program or a mobile commerce application program, such as the mobile commerce application program or module 108 or the mobile commerce application program 116(1), can transmit a list of items on the bill 139 to each of the consumers 122(1)-122(N) to indicate whether the consumer, such as consumer 122(1) will pay for certain items. For example, a consumer 122(1) may utilize a mobile commerce application program, such as the mobile commerce application program 116(1), to provide a check mark by his or her entrée, drink, and dessert on a list generated on a user interface associated with a respective mobile device 120(1). After providing an indication of the meal items associated with the consumer 122(1), the mobile commerce application program can tally the consumer's respective bill and permit the consumer to add a tip or otherwise automatically add a tip to the consumer's respective bill. In some instances, the consumer 122(1) can transmit the indication to the mobile commerce application program 108 executing on the merchant computer system 112 and/or merchant computer device 114. The consumer's respective bill can be tallied by the mobile commerce application program 108, and the respective bill can be transmitted back to the consumer's mobile device 120(1). The consumer 122(1) can receive the respective bill, and the mobile commerce application program 116(1) can permit a tip to be added by the consumer 122(1) or automatically add to the consumer's respective bill. In any instance, the split the bill application program or mobile commerce application program, such as the mobile commerce application program or module 108 or the mobile commerce application program 116(1), may coordinate the payment of any number of respective consumer bills, and reconcile the amounts provided by each consumer to ensure the total amount paid by a group is sufficient to pay the total restaurant bill for the group. Notifications can be provided by the mobile commerce application program, such as the mobile commerce application program or module 108 or the mobile commerce application program 116(1), to the consumers if certain items remain unpaid, and notifications can be provided to the restaurant if certain items are disputed by the group of consumers.

Figure 3:
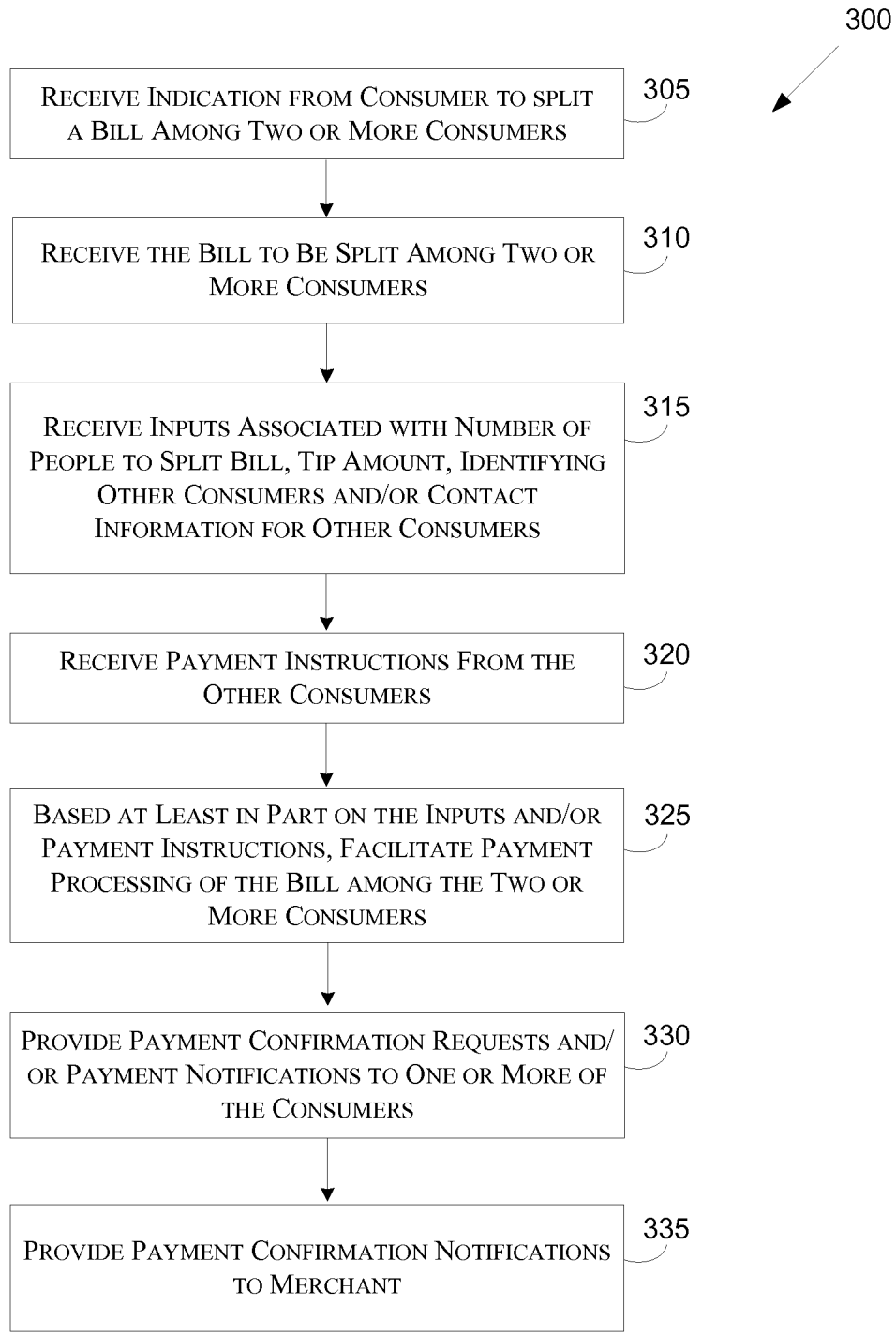
FIGS. 3-15 illustrate example methods for facilitating bill payment functionality in mobile commerce according to certain embodiments of the disclosure.
Figure 4:
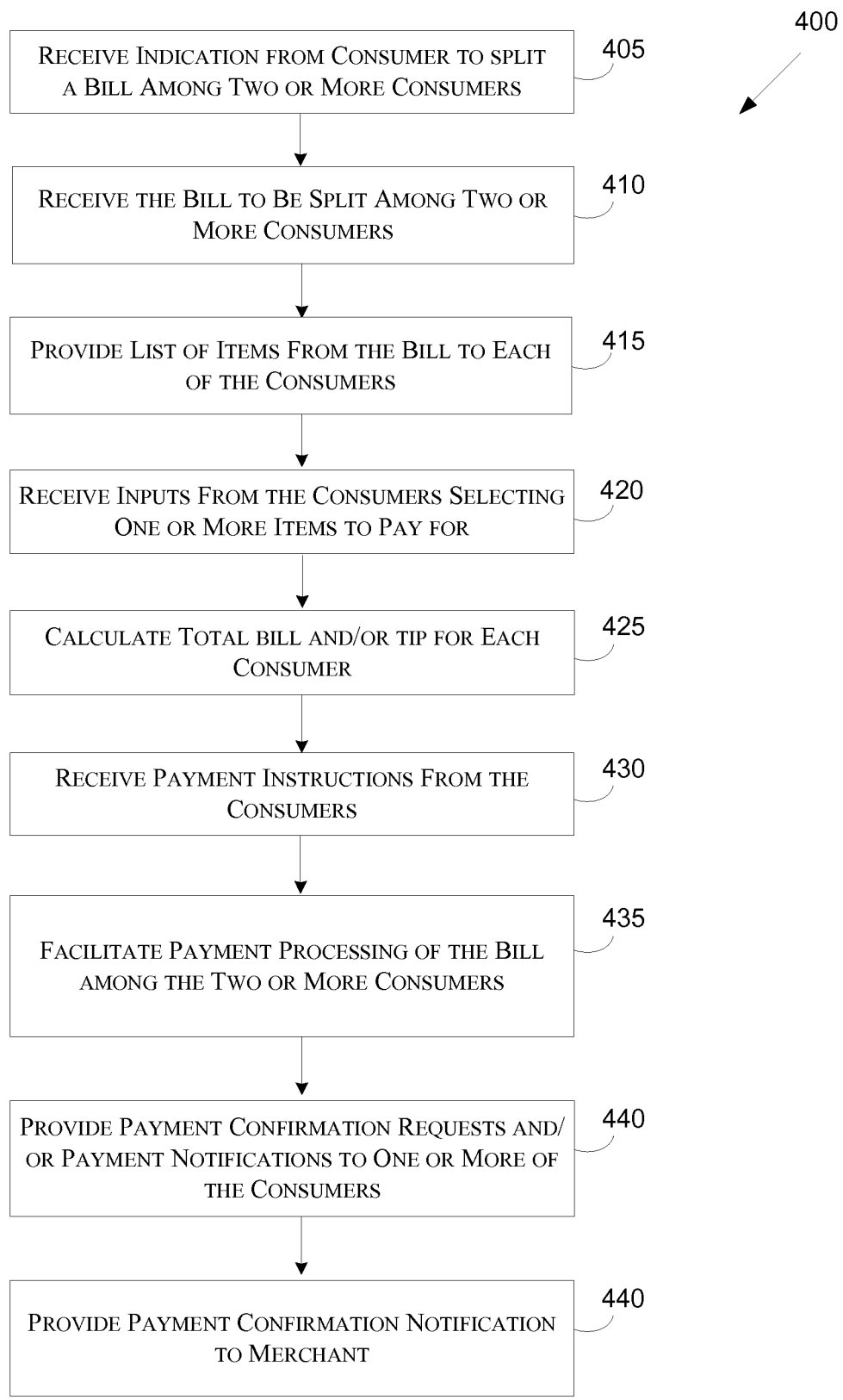
Figure 5:
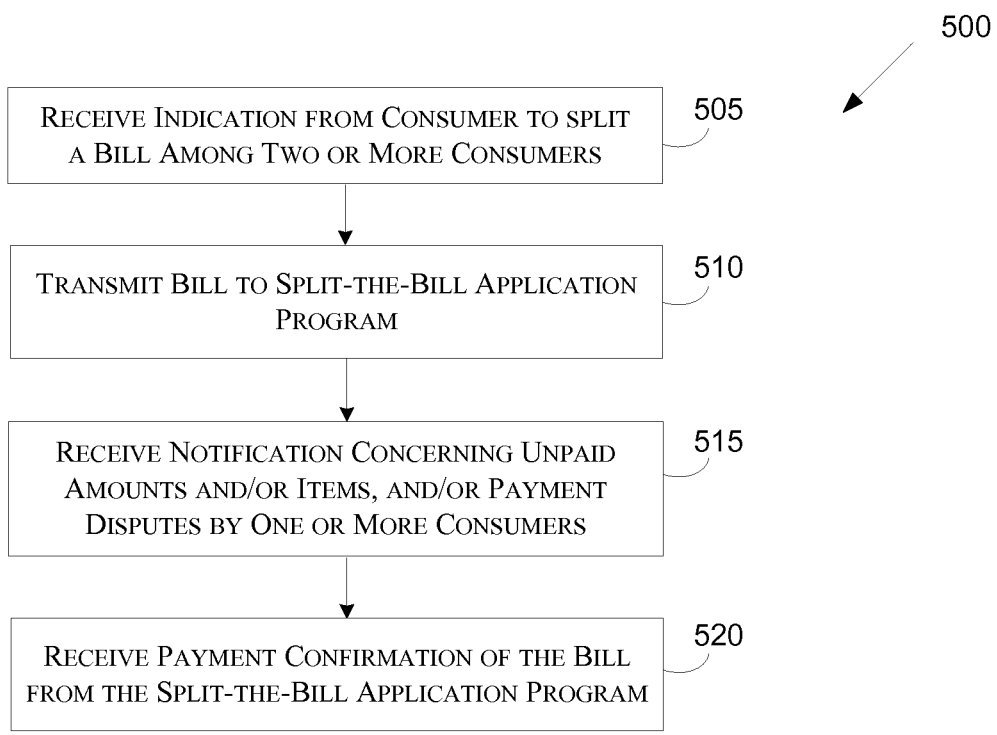

FIGS. 3-5 illustrate example methods according to embodiments of the disclosure. Various operations of the methods described below can be performed by the system components described above and shown in FIGS. 1 and 2. In FIG. 3, the method 300 can begin in block 305. In block 305, an indication can be received from a consumer to split a bill among two or more consumers. Block 305 is followed by block 310, in which the bill to be split among two or more consumers is received. Block 310 is followed by block 315, in which inputs associated with a number of people to split the bill, tip amount, identifying other consumers and/or contact information for the other consumers can be received. Block 315 is followed by block 320, in which payment instructions can be received from the other consumers. Block 320 is followed by block 325, in which payment processing of the bill among two or more consumers can be facilitated based at least in part on the received inputs and/or payment instructions. Block 325 is followed by block 330, in which payment confirmation requests and/or payment notifications can be provided to one or more of the consumers. Block 330 is followed by block 335, in which payment confirmation can be provided to the merchant. The method 300 can end after block 335.

In FIG. 4, the method 400 can begin in block 405. In block 405, an indication can be received from a consumer to split a bill among two or more consumers. Block 405 is followed by block 410, in which the bill to be split among two or more consumers is received. Block 410 is followed by block 415, in which a list of items from the bill can be provided to each of the consumers. Block 415 is followed by block 420, in which inputs can be received from the consumers selecting one or more items to pay for. Block 420 is followed by block 425, in which the total bill and/or tip for each consumer can be calculated. Block 425 is followed by block 430, in which payment instructions can be received from the consumers. Block 430 is followed by block 435, in which payment processing of the bill among the two or more consumers can be facilitated. Block 435 is followed by block 440, in which confirmation requests and/or payment notifications can be provided to one or more of the consumers. Block 440 is followed by block 440, in which payment confirmation can be provided to the merchant. The method 400 can end after block 445.

In FIG. 5, the method 500 can begin in block 505. In block 505, an indication can be received from a consumer to split a bill among two or more consumers. Block 505 is followed by block 510, in which the bill is transmitted to a split the bill application program. Block 510 is followed by block 515, in which a notification can be received concerning unpaid amounts and/or items, and/or payment disputes by one or more consumers. Block 515 is followed by block 520, in which payment confirmation of the bill can be received from the split the bill application program. The method 500 can end after block 520.

Using some or all of the above systems and processes, a technical solution facilitating bill payment functionality in mobile commerce can be enabled. For example, technical solutions involving splitting a restaurant bill among multiple consumers can be implemented. In this manner, technical solutions can be implemented such that consumers can better manage budgets as well as consumer spending, and be better informed about information that may affect the consumer's decision to complete a purchase transaction.

Restaurant Mobile Payment

In some instances, consumers desire to pay for a transaction using a mobile phone or other client device. Certain embodiments of the disclosure can provide systems and processes for paying for a transaction, such as a bill at a restaurant, with a consumer mobile device, such as the mobile device 120(1) in FIG. 1, or other client device based on information provided in the bill. The methods can be implemented on a consumer mobile device 120(1), a merchant computer system, such as the merchant system computer 112, and/or a merchant computer device, such as the merchant system device 114, and a host or server device, such as the server transaction processing system 106. For example, FIGS. 6-11 illustrate example methods 600, 700, 800, 900, 1000, 1100 for code-based payment of products or services provided by a merchant according to certain embodiments of the disclosure. Various operations of the methods described below can be performed by the system components described above and shown in FIGS. 1 and 2. The following methods are described with reference to a merchant that is a restaurant. However, the example methods are not so limited and can be applied to any type of merchant, irrespective of their type of business to provide a way for code based payment for products and/or services using a mobile phone or other mobile device of a consumer.

Figure 6:
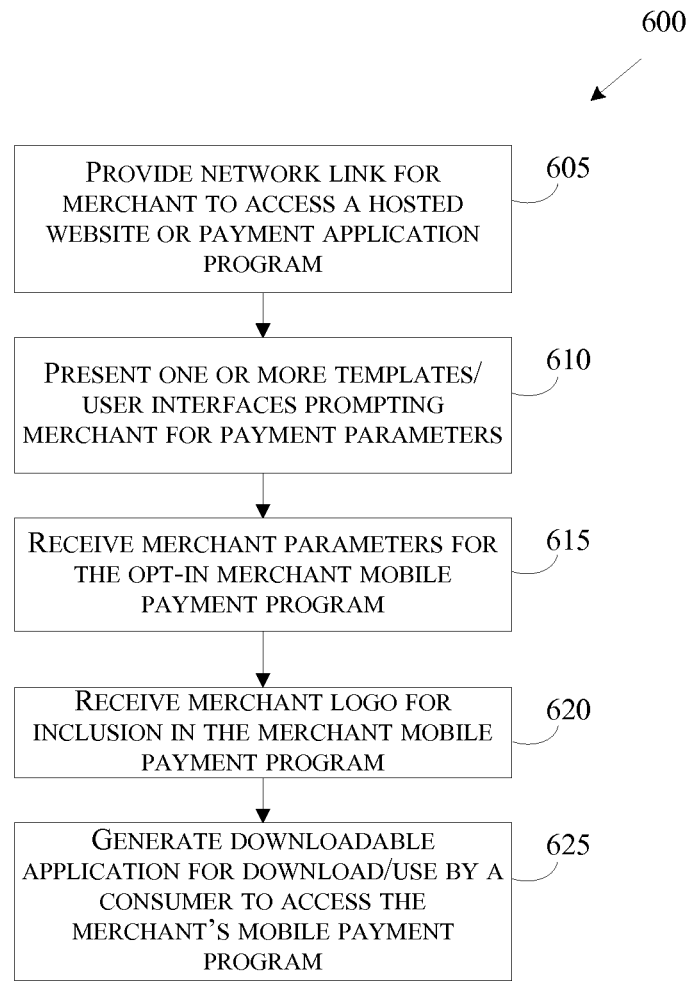

With reference now to FIGS. 6-11, the example methods 600, 700, 800, 900, 1000, 1100 can begin at FIG. 6, where, in block 605, a network link can be provided for access by a merchant (e.g., via a merchant computer system or merchant computer device) to a hosted website, such as the one or more websites 134 in FIG. 1, or payment application program, such a mobile commerce application program 102 executing on a host or service device 106. For example, a merchant computer system, such as the merchant system computer 112, and/or merchant computer device, such as the merchant system device 114, may be provided access to a mobile commerce application program 102, which may include a restaurant mobile payment module. In one example, by way of a client device, such as a merchant computer system, such as the merchant system computer 112, and/or merchant computer device, such as the merchant system device 114, a merchant can link via at least one network, such as the network(s) 126, to the restaurant mobile payment module and/or mobile commerce application program 102 on the server device 106 to configure a customized payment program.

In block 610, one or more templates and/or user interfaces can be presented to prompt the merchant for payment parameters. For example, the restaurant mobile payment module and/or mobile commerce application program 102 may generate or otherwise present to the merchant a series of templates or predefined user interfaces. In block 615, merchant parameters for an opt-in mobile payment program can be received from the merchant. For instance, the restaurant mobile payment module and/or mobile commerce application program 102 executing on the server device 106 can implement a set of computer-executable instructions to enable an opt-in mobile payment program. When prompted, the merchant can select one or more parameters for a payment program, such as, but not limited to, payment methods that can be used, any minimum payment requirements associated with one or more of the payment methods (e.g. minimum amount for use of a credit or debit card), any additional fees that will be added to a transaction if certain payment methods are used (e.g. additional fees for use of a credit or debit card), and any additional information that will need to be provided by a consumer when using particular payment methods.

In block 620, a logo, other trademark, trade name, or other business identifier for the merchant can be received for inclusion in the opt-in mobile payment program. For example, when prompted, the merchant can upload a business logo from the merchant computer system 112 and/or merchant computer device 114 to the restaurant mobile payment module and/or mobile commerce application program 102 at the server device 106. In block 625, a downloadable application for use by a consumer can be generated. For instance, after the merchant inputs the business logo and parameters for a payment program, the restaurant mobile payment module and/or mobile commerce application program 102, or hosted website, such as 134, can execute a set of computer-executable instructions to implement the merchant's payment program, such as offering the program as a consumer downloadable mobile commerce application program, such as the mobile commerce application program 116(1), or app in a mobile application store or website. In some embodiments, the mobile commerce application program 116(1) may be branded with the merchant's logo and/or name and may include a restaurant mobile payment module or provide access thereto. In some embodiments, the mobile commerce application program 116(1) may be the same application program for some or all merchants, or those merchants within a single classification or geographical location. In the manner described above, various merchants, regardless of size, can adopt and implement a bill payment module as a part of a mobile payment application program. The method 600 can then end.

Figure 7:
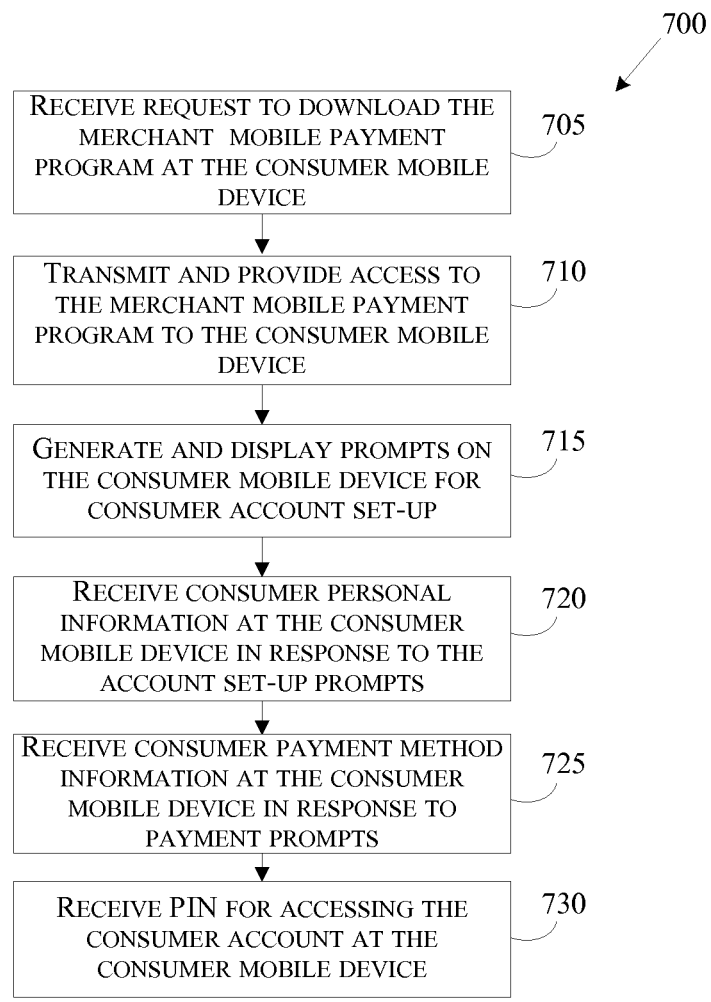

Referring now to FIG. 7, the example method 700 can begin at block 705 with receiving a request to download a merchant mobile payment program, such as the mobile commerce application program, such as the mobile commerce application program 116(1) in FIG. 1, that includes a restaurant mobile payment module. The consumer's mobile device, such as the mobile device 120(1), or other client device can communicate, with a host or server device, such as the server transaction processing system 106, via at least one network, such as the network(s) 126, some or all information associated with a scanned QR code, bar code, information provided via near-field communication, or other code or name input from the consumer, such as the consumer 122(1), at the consumer's mobile device 120(1).

In block 710, a merchant mobile payment program can be transmitted to and access can be provided to the consumer's mobile device. For example, using the information received in the previous operation, the host or server device 106 can identify the merchant's mobile payment program, and download the consumer downloadable mobile commerce application program 116(1) to the consumer's mobile device 120(1). In one embodiment, the application program 116(1), including the restaurant mobile payment module, can be transmitted via the network 126 from the host or server device 106 to the consumer's mobile device 120(1) for download. For example, by way of a consumer's mobile device 120(1), a consumer, such as the consumer 122(1), can download a merchant-branded mobile commerce application program 116(1) that includes the restaurant mobile payment module to the consumer's mobile device 120(1).

In block 715, the application program 116(1) can generate and display on the consumer's mobile device 120(1) one or more account set-up prompts. For example, the prompts can include one or more fields for receiving personal information and any other types of information known to the consumer 122(1) for creating a personalized account for the restaurant mobile payment module. In block 720, one or more inputs associated with the set-up prompts can be received at the I/O interface of the consumer's mobile device. For example, when prompted, the consumer 122(1) can create an account and input certain personal information to the application program 116(1), such as a name, address, mobile telephone number, email, or messaging address. In block 725, consumer payment method information can be received at the consumer mobile device. For example, the payment method information may include payment device information, credit card account information, debit card account information, stored value card or account information checking account information, and/or savings account information. This payment method information may be previously stored or accessible via an authorization token on the consumer's mobile device 120(1), such as in the bill payment module and/or mobile commerce application program 116(1). As such, the restaurant mobile payment module and/or mobile commerce application program 116(1) may retrieve stored payment method information in memory, such as the memory 118(1), a data store such as the data store 151, and/or from the host or server device 106 that may be accessible by the consumer 122(1), and can display the payment method information for selection on the display of the consumer's mobile device 120(1). In certain instances, all or a portion of this personal information and payment method information may be stored in memory 118(1) of the consumer's mobile device 120(1), or in the memory, such as the memory 104, or a database, such as the data store 151, associated with the host or server device 106 and accessible via an authorization token stored in the memory 118(1) of the consumer's mobile device 120(1) or as part of the restaurant mobile payment module and/or mobile commerce application program 116(1) executing on the consumer's mobile device 120(1). Optionally, in block 730, a PIN code for accessing the consumer account can be received at the consumer mobile device. For example, the consumer 122(1) can input a PIN or other code at the display for use in accessing the consumer's account in the restaurant mobile payment module and/or mobile commerce application program 116(1). In this way, access to the consumer's personal information and payment method information may be secured.

After the consumer account has been configured, and the mobile payment application program, such as the restaurant mobile payment module and/or mobile commerce application program 116(1) has stored information associated with the consumer account, the consumer 122(1) can utilize the account via a user interface provided by the application program 116(1) as a mobile digital payment device in the merchant's mobile payment program, such as via the mobile commerce application program, such as the mobile commerce application program or module 108. The application program 116(1) can provide the consumer 122(1) with any number of tools to facilitate purchases, such as near-field communication, a QR code scanner, bar code scanner, a payment button, a keypad, a voice input payment command, etc. In some embodiments, the consumer 122(1) can verify a payment command or instruction by entering his or her PIN or other code. The method 700 can then end.

Figure 8:
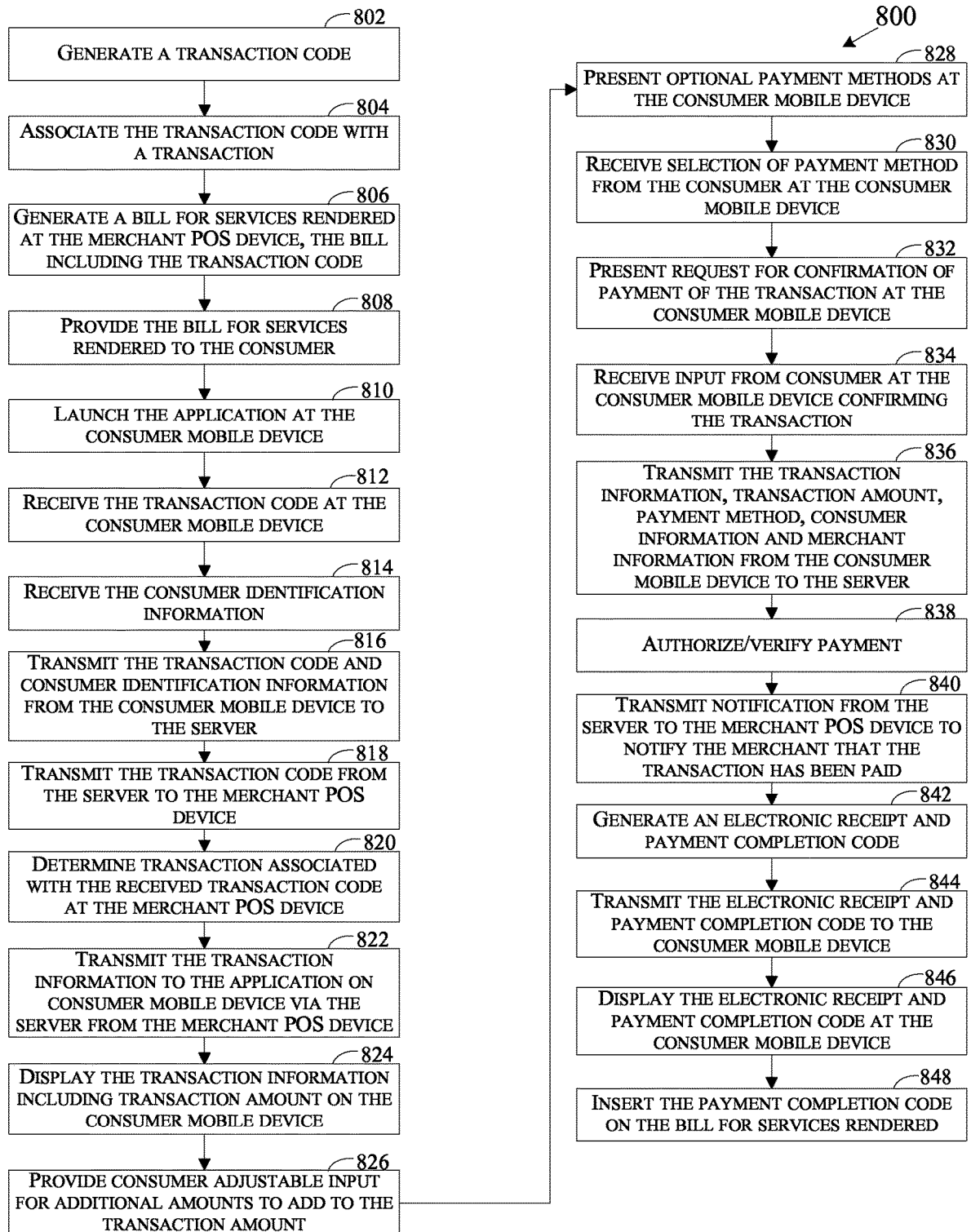

Referring now to FIG. 8, the example method 800 begins at block 802, where a transaction code can be generated. For example, the transaction code can be generated by a code generation module in the mobile commerce application program, such as the mobile commerce application program or module 108 in FIG. 1, of the merchant computer system, such as the merchant system computer 112, and/or merchant computer device, such as the merchant system devices 114, or by a host or server device, such as the server transaction processing system 106. In certain embodiments, a bill, such as the bill 139, for a meal at a restaurant can be provided by the merchant to the customer. The bill 139 can alternatively be for other goods and/or services at other types of merchants. The bill 139 can be in the form of a hard-copy statement or in an electronic form that is transmitted from the merchant, such as from the merchant computer system 112 and/or merchant computer device 114, such as the merchant's POS system, to the consumer's mobile device, such as the mobile device 120(1), or other client device. In block 804, the transaction code can be associated with a transaction. In certain embodiments, the restaurant mobile payment module or another portion of the merchant system, such as a mobile commerce application program 108 executing on the merchant computer system 112 and/or merchant computer device 114 can associate the transaction code with a transaction. For example, the transaction code can be associated by the mobile commerce application program 108 with a paper transaction by printing the transaction code on the transaction and can be associated electronically by the mobile commerce application program 108 by linking the transaction code with an electronic form of the transaction. In another embodiment, the mobile commerce application program 108 executing on the merchant computer system 112 and/or merchant computer device 114 can communicate with the host or server device 106, and an associated mobile commerce application program, such as the mobile commerce application program or module 102, executing on the host or server device 106 to administer the transaction code and transaction by storing the information in a memory, such as the memory 104, and/or data storage device, such as the data store 151, associated with the host or server device 106.

In block 806, a bill for services and/or products can be generated at the merchant computer system and/or merchant computer device (e.g., a merchant POS device) and can include the transaction code. In one example, the customer bill 139 at a restaurant can be a printed, hard-copy bill that includes a transaction code printed thereon. The transaction code can include, but is not limited to, an alphanumeric code, a QR code, or a bar code. In addition to being printed on the hard-copy of the bill 139, the transaction code can be associated with the particular bill in the merchant computer system 112 and/or merchant computer device 114. In block 808, the hard-copy of the bill 139 is provided to the consumer 122(1) for review and payment. For example, the bill 139 can be placed adjacent to the consumer 122(1) within the restaurant.

In block 810, the consumer can launch the application program that contains or accesses the restaurant mobile payment module at the consumer mobile device. In one embodiment, the consumer 122(1) can launch the mobile commerce application program 116(1) on the consumer's mobile device 120(1) by, for example, manually touching an icon on the display of the mobile device 120(1) associated with the application program 116(1). In another embodiment, if the consumer, such as the consumer 122(1) has not yet downloaded a mobile commerce application program, such as the mobile commerce application program 116(1), onto his or her mobile device 120(1), the consumer 122(1) can scan a QR code or bar code with an embedded transaction code with the mobile device 120(1), and the mobile commerce application program 116(1) can be downloaded to the consumer's mobile device 120(1) and launched for use by the consumer 122(1).

In block 812, the application program 116(1) can receive the transaction code at the consumer mobile device. In examples where the bill may include an alpha-numeric code, the consumer 122(1) can enter the alpha-numeric code into the mobile commerce application program 116(1) on the mobile device 120(1) or other client device. In examples where the bill may include a QR code or bar code, the consumer 122(1) can scan the QR code or bar code with the consumer's mobile device 120(1) or other client device. In any instance, the transaction code can be input to the consumer's mobile device 120(1), wherein the associated mobile commerce application program 116(1) can receive and process the transaction code.

In block 814, information identifying the consumer can be received. In one embodiment, this information can be received from memory, such as the memory 118(1), of the consumer's mobile device 120(1), or from the restaurant mobile payment module and/or mobile commerce application program 116(1) executing on the consumer's mobile device 120(1). In another embodiment, the restaurant mobile payment module and/or mobile commerce application program 116(1) can request the information needed by generating a display of prompts on the user interface of the mobile device 120(1), which are intended to receive corresponding inputs from the consumer 122(1) at the user interface. In block 816, the consumer information and the transaction code can be transmitted from the consumer's mobile device 120(1) to the host or server device 106. In block 818, the host or server device 106 can transmit the transaction code to the merchant computer system 112 and/or merchant computer device 114 (e.g., the merchant POS device at the restaurant in which the consumer is located). In some embodiments, the consumer information and the transaction code may be transmitted directly from the consumer's mobile device 120(1) to the merchant computer system 112 and/or merchant computer device 114.

In block 820, the transaction code can be evaluated by the merchant computer system and/or merchant computer device to determine the transaction associated with the transaction code. For example, if the transaction code is routed through the host or server device 106 from the consumer's mobile device 120(1), the host or server device 106 can reference the transaction associated with the transaction code. In block 822, the transaction amount and other information on the bill 139, such as a line-item display of the contents of the bill 139 or tip information, can be transmitted from the merchant computer system 112 and/or merchant computer device 114 to the consumer's mobile device 120(1) either directly or via the host or server device 106. In one embodiment, the transaction amount and bill information can be received by the restaurant mobile payment module of the mobile commerce application program 116 (1). Alternatively, the merchant can have previously stored information at the host or server device 106 for the transaction and the associated code and the comparison can be completed at the host or server device 106.

The restaurant mobile payment module of the mobile commerce application program 116(1) can receive the transaction amount and can display the transaction amount, and optionally other information on the bill 139, on the display of the consumer's mobile device 120(1) in block 824. The restaurant mobile pay module of the mobile commerce application program 116(1) can also provide prompts or fields whereby the consumer 122(1) can input information that changes to total amount of the bill 139 in block 826. For example, the module of the mobile commerce application program 116(1) could provide a tip field, so that the consumer 122(1) could enter in a tip amount that would adjust the overall total of the bill 139. For example, the consumer 122(1) can view the transaction amount on the consumer's mobile device 120(1) and can be provided an area to add a tip to the transaction amount or other additional information, such as comments regarding the quality of the merchant's service or other level of service.

In block 828, optional payment methods can be displayed on the consumer's mobile device for selection by the consumer. In one embodiment, the restaurant mobile payment module of the mobile commerce application program 116(1) can retrieve one or more of the payment methods previously stored with the module. Alternatively, the restaurant mobile payment module of the mobile commerce application program 116(1) could retrieve all payment methods associated with the consumer's mobile device 120(1), such as those stored in memory, such as the memory 118(1) of the device 120(1) or the host or server device 106, and/or any one for which an authorization token has been stored on the mobile device 120(1). In any instance, the consumer 122(1) can select the payment method to be used for payment of this transaction amount in block 830. For example, the consumer 122(1) can manually select an icon presented on the touch-enabled display screen of the consumer's mobile device 120(1) that is associated with the payment method desired by the consumer 122(1).

In block 832, a request for confirmation of payment of the transaction can be presented at the consumer's mobile device. In block 834, an input can be received from the consumer 122(1) at the consumer's mobile device 120(1) confirming the transaction.

In block 836, the transaction information, transaction amount, tip amount, payment method, consumer information, and or merchant information can be transmitted from the consumer's mobile device 120(1) to the host or server device 106 by the restaurant mobile payment module of the mobile commerce application program 116(1). In certain embodiments, the consumer 122(1) can confirm the transaction and/or the amount or the transaction by manually selecting an icon presented on the touch-enabled display screen of the consumer's mobile device 120(1). The consumer's mobile device 120(1) can then communicate with the host or server device 116(1) and transmit the information associated with the payment method selected by the consumer 122(1) along with other information identifying the consumer 122(1), the transaction, the transaction amount, and/or the merchant to the host or server device 106. In certain embodiments, instead of transmitting payment method information, an authorization token is sent to the host or server device 106 to provide access to the payment method information.

In block 838, the payment can be authorized. For example, the host or server device 106 can transmit the transaction information and the payment information to a merchant computer system 112 and/or merchant computer device 114, such as a merchant POS device, or a third party payment processor, such as a financial institution 124, to process the payment. In some embodiments, after the mobile commerce application program 116(1) receives the consumer inputs for the bill 139, such as confirming the total amount including a tip amount, and a suitable payment device for payment of the transaction, the mobile commerce application program 116(1) can transmit the information to the host and/or server device 106 and/or a financial institution, such as the financial institution system 124, either directly or via the merchant computer system 112 and/or merchant computer device 114, wherein the host or server device 106 and/or a financial institution 124 can match the received information to the transaction and process the transaction. Various authentication and/or security techniques and devices may be employed during the matching and processing of the transaction, including, but not limited to, encrypting data, hashing, validity checking, signature checking, data matching, etc. Once the payment has been processed, the host or server device 106 and/or financial institution 124 can communicate with the merchant computer system 112 and/or merchant computer device 114, such as a merchant POS device, to notify the merchant that the transaction has been paid in block 840. The information provided to the merchant computer system 112 and/or merchant computer device 114 by the host or server device 106 and/or financial institution 124 can include the original transaction amount, any additional tip amount, a final transaction amount, as well as any other information provided by the consumer 122(1). In block 842, the merchant computer device 114, such as a merchant POS device, or the merchant computer system 112 can generate and transmit an electronic receipt for the transaction to the consumer's mobile device 120(1) either directly or via the host or server device 106.

In addition, some or any of the host or server device 106, financial institution 124, or the merchant computer system 112 and/or merchant computer device 114 can generate a payment completion code. In one embodiment, the payment completion code can be an alphanumeric code; however, other code types are contemplated and within the scope of this disclosure. In block 844, the electronic receipt and the payment completion code can be transmitted to the consumer's mobile device 120(1). For example, the receipt can be transmitted by the merchant computer system 112 and/or merchant computer device 114 and/or financial institution 124 to the restaurant mobile payment module of the mobile commerce application program 116(1), either directly or via the host or server device 106. Further, the payment completion code can be transmitted to the restaurant mobile payment module of the mobile commerce application program 116(1) executing at the mobile device 120(1) by the merchant computer system 112 and/or merchant computer device 114 or the host or server 106 and/or financial institution 124. In block 846, the electronic receipt and payment completion code can be displayed by the restaurant mobile payment module of the mobile commerce application program 116(1) executing on the consumer's mobile device 120(1). In block 848, the consumer 122(1) can identify the payment completion code on the display and provide the payment completion code to the merchant to prove the payment was successfully completed by, for example, manually inputting the payment completion code on the bill 139 previously provided by the merchant. The merchant can enter the transaction completion code into the merchant computer system 112 and/or merchant computer device 114 (e.g., via the merchant POS device) to verify that, in fact, the consumer 122(1) has paid the bill 139. The process 800 can then end.

Figure 9:
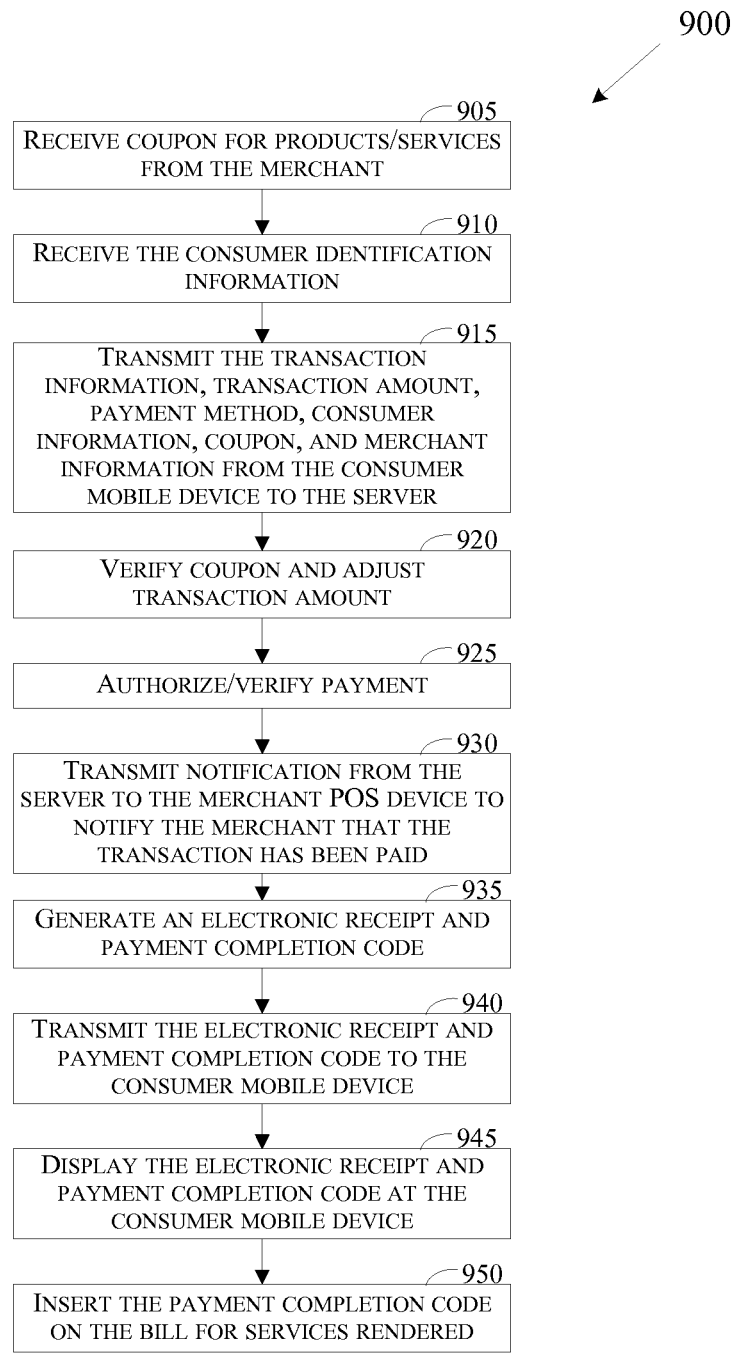

In addition to the methods described above, in certain embodiments, the merchant can provide a coupon or other offer associated with a transaction at the merchant. Referring now to FIG. 9, the method 900 can begin at block 905, where a coupon or other offer for products and/or services of the merchant can be received. The offer can be an electronic offer, such as an offer in an Internet advertisement or an email offer, or the offer can be in physical form and associated with a website, such as the one or more websites 134 in FIG. 1, accessible by the consumer, such as the consumer 122(1). Alternatively, the physical offer can include a code, such as an alphanumeric code, QR code or bar code. In each case, the consumer 122(1) can transmit the merchant's offer from one digital or physical medium to the consumer's mobile device, such as the mobile device 120 (1), and associate the offer with the transaction at the merchant.

In block 910, the consumer's mobile device can receive the consumer identification information. For example, the consumer identification information can be retrieved by a restaurant mobile payment module of a mobile commerce application program, such as the mobile commerce application program 116(1) from memory, such as the memory 118(1), based at least in part on information initially provided by the consumer 122(1) when setting up the account. In block 915, the transaction information, transaction amount, selected payment method, consumer information, coupon, and/or merchant information can be transmitted from the consumer's mobile device to the host or server device by the restaurant mobile payment module of the mobile commerce application program. As discussed above, in certain embodiments, the consumer 122(1) can confirm the transaction and/or the amount or the transaction by manually selecting an icon presented on the touch-enabled display screen of the consumer's mobile device 120(1). The consumer's mobile device 120(1) can communicate with the host or server device 106 and transmit the information associated with the payment method selected by the consumer 122(1) along with other information identifying the consumer 122(1), the transaction, the transaction amount, the coupon and/or the merchant to the host or server device 106. In certain embodiments, instead of transmitting payment method information, an authorization token is sent to the host or server device 106 to provide access to the payment method information stored at the host or server 106 and/or in a database, such as data store 151, associated with and communicably coupled to the host or server 106. All or a portion of the information can be transmitted to the merchant computer system 112 and/or merchant computer device 114.

In block 920, the merchant computer system can verify the coupon and can adjust the transaction amount. In block 925, the payment can be authorized. For example, the host or server device 106 can transmit the transaction information and the payment information to the merchant computer system 112 and/or merchant computer device 114, such as merchant POS device, or a third party payment processor, such as a financial institution 124, to process the payment. Once the payment has been processed, the host or server device 106 can communicate with the merchant computer system 112 and/or merchant computer device 114, such as a POS device, to notify the merchant that the transaction has been paid in block 930. The information provided to the merchant computer system 112 and/or merchant computer device 114 by the host or server device 106 can include the original transaction amount, any additional tip amount, a final transaction amount, a coupon amount, as well as any other information provided by the consumer. In block 935, the merchant computer system 112 and/or merchant computer device 114, such as a POS device, can generate and transmit an electronic receipt for the transaction to the consumer's mobile device 120(1) either directly or via the host or server device 106.

In addition, either the host or server device 106, or the merchant computer system 112 and/or merchant computer device 114 can generate a payment completion code. In one embodiment, the payment completion code can be an alpha-numeric code; however, other code types are contemplated and within the scope of this disclosure. In block 940, the electronic receipt and the payment completion code can be transmitted to the consumer's mobile device 120(1). For example, the receipt can be transmitted by the merchant computer system 112 and/or merchant computer device 114 to the restaurant mobile payment module of the mobile commerce application program 116(1), either directly or via the host or server device 106. Further, the payment completion code can be transmitted to the restaurant mobile payment module of the mobile commerce application program 116(1) at the mobile device 120(1) by the merchant computer system 112 and/or merchant computer device 114 or the host or server device 106. In block 945, the electronic receipt and payment completion code can be displayed by the restaurant mobile payment module of the mobile commerce application program 116(1) on the consumer's mobile device 120(1). In block 950, the consumer 122(1) can identify the payment completion code on the display and provide the payment completion code to the merchant to prove the payment was successfully completed by, for example, manually inputting the payment completion code on the bill 139 previously provided by the merchant. The merchant can enter the payment completion code into the merchant computer system 112 and/or merchant computer device 114 (e.g., via the merchant POS device) to verify that, in fact, the consumer 122(1) has paid the bill 139. The process 900 can then end.

Figure 10:
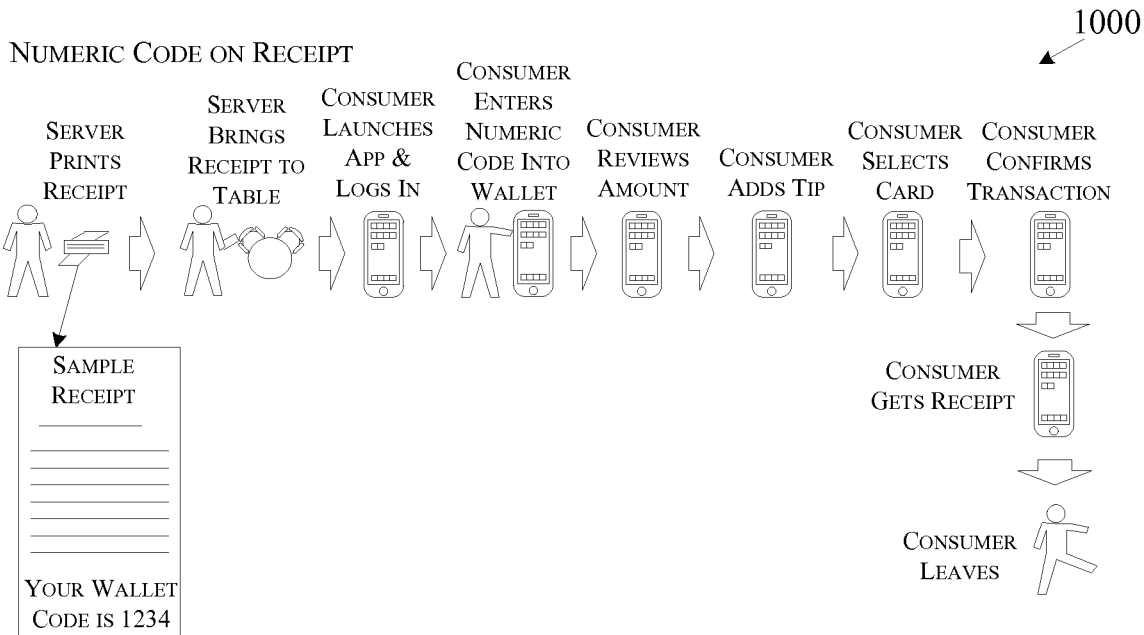

FIG. 10 illustrates an example method 1000 according to an embodiment of the disclosure. In a first instance, a merchant or restaurant service personnel can print a receipt. In a second instance, the merchant or restaurant service personnel can bring the receipt to a consumer's table. In a third instance, the consumer can launch a mobile commerce application program or app, and log in to the program or app. In a fourth instance, the consumer can enter a numeric code into the mobile commerce application program or app. In a fifth instance, the consumer can review the bill amount. In a sixth instance, the consumer can add a tip to the bill amount. In a seventh instance, the consumer can select a payment device such as a card. In an eighth instance, the consumer can confirm the transaction and total bill amount including the tip. In a ninth instance, the consumer can receive an electronic receipt after the payment transaction is complete. The method 1000 can then end.

Figure 11:
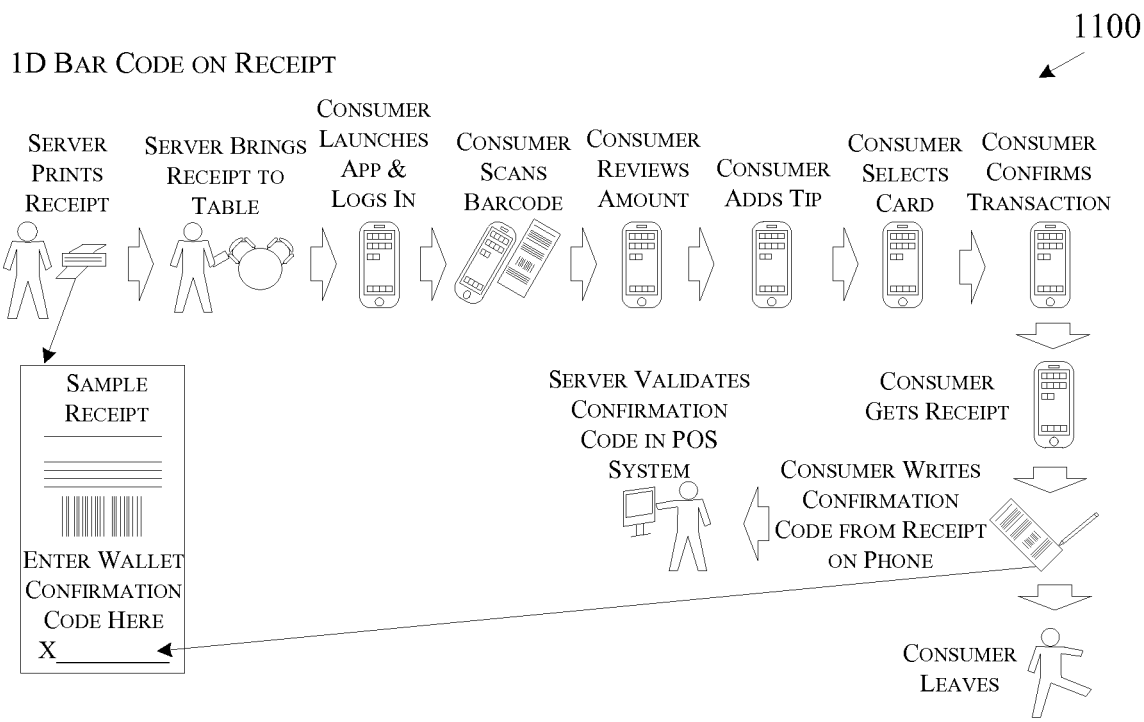

FIG. 11 illustrates an example method 1100 according to an embodiment of the disclosure. In a first instance, a merchant or restaurant service personnel can print a receipt. In a second instance, the merchant or restaurant service personnel can bring the receipt to a consumer's table. In a third instance, the consumer can launch a mobile commerce application program or app, and log in to the program or app. In a fourth instance, the consumer can scan a bar code into the mobile commerce application program or app using his or her mobile device. In a fifth instance, the consumer can review the bill amount. In a sixth instance, the consumer can add a tip to the bill amount. In a seventh instance, the consumer can select a payment device such as a card. In an eighth instance, the consumer can confirm the transaction and total bill amount including the tip. In a ninth instance, the consumer can receive an electronic receipt after the payment transaction is complete. In a tenth instance, the consumer can input a payment confirmation code from the electronic receipt on the printed receipt. In an eleventh instance, the merchant or restaurant service personnel can validate the confirmation code in a merchant computer system, merchant computer device, and/or a POS device. The method 1100 can then end.

Using some or all of the above systems and processes, a technical solution facilitating bill payment functionality in mobile commerce can be enabled. For example, technical solutions for paying for a transaction, such as a bill at a restaurant, with a consumer mobile device or other client device based on information provided in the bill can be implemented. In this manner, technical solutions can be implemented such that consumers can better manage budgets as well as consumer spending, and be better informed about information that may affect the consumer's decision to complete a purchase transaction.

Check in to Pay at Quick Service Restaurant (QSR)

In some instances, consumers desire to pay for products or services in a drive-thru setting without having to extend a mobile phone or other client device outside of the consumer's vehicle. Certain embodiments of the disclosure can provide systems and processes for a drive-thru payment program for products and services without the need for near-field communication or QR codes. The program can be implemented on a consumer's mobile phone or other client device.

By way of a client device, such as a merchant computer system, for example 112 in FIG. 1 and/or a merchant computer device, for example 114, a merchant can link via at least one network 126 to a hosted website, such as the one or more websites 134, or to a loyalty/rewards application program and/or mobile commerce application program, such as the mobile commerce application program or module 102, executing on a host or server device, such as the server transaction processing system 106, and configure a customized payment or payment and loyalty/reward program using, for example, a series of templates or predefined user interfaces. For instance, a hosted website 134 or payment and loyalty/rewards application program and/or mobile commerce application program 102 executing on a host or server device 106 can implement a set of computer-executable instructions to enable an opt-in mobile payment and loyalty/reward program. When prompted by the loyalty/rewards application program and/or mobile commerce application program 102, the merchant can upload a business logo and select one or more parameters for electronic payment of transactions, such as payment methods that can be used, any minimum payment requirements associated with one or more of the payment methods (e.g. minimum amount for use of a credit or debit card), any additional fees that will be added to a transaction if certain payment methods are used (e.g. additional fees for use of a credit or debit card), and any additional information that will need to be provided by a consumer when using particular payment methods. In addition, the merchant can select via the loyalty/rewards application program and/or mobile commerce application program 102 one or more parameters for a loyalty/rewards program, such as a number of points to reward per consumer visit or purchase, and a minimum number of reward points needed to redeem for a reward. After the merchant inputs via the loyalty/rewards application program and/or mobile commerce application program 102 the business logo parameters for payment, and parameters for a loyalty/rewards program, if any, the hosted website 134 or payment and loyalty/rewards application program and/or mobile commerce application program 102 can execute a set of computer-executable instructions to implement the merchant's payment and loyalty/reward program, such as offering the program as a consumer downloadable application program, mobile commerce application program, such as the mobile commerce application program 116(1), or app in a mobile application store or website. In some embodiments, the consumer downloadable application program, mobile commerce application program, such as the mobile commerce application program 116(1), or app may be branded with the merchant's logo and/or name. In some embodiments, the consumer downloadable application program, mobile commerce application program, such as the mobile commerce application program 116(1), or app may be the same application program, mobile commerce application program, such as the mobile commerce application program 116(1), or app for some or all merchants within a single classification or geographical location. In the manner described above, various merchants, regardless of size, can adopt and implement a loyalty/rewards program.

In one embodiment, by way of a mobile device, such as the mobile device 120(1), or other client device, such as a laptop computer or tablet, a consumer, such as consumer 122(1), can download the merchant-branded consumer downloadable application program, mobile commerce application program, such as the mobile commerce application program 116(1), or app to the mobile device 120(1), phone, or other client device. When prompted, the consumer 122(1) can create an account and input certain personal and/or identification information to the mobile commerce application program 116(1) or app, such as a name, mobile telephone number, email or messaging address, or social media application account name. In some embodiments, the consumer 122(1) can input via the mobile commerce application program 116(1) or app a payment method, such as adding a bank account number, payment device number, security code, credit card number and associated information, debit card number and associated information, loyalty card number and associated information, gift card number and associated information etc., and, in some instances, the consumer 122(1) can charge, load, or otherwise authorize the account with a pre-paid value for use in purchasing the merchant's goods and/or services. In some embodiments, the consumer 122(1) can create via the mobile commerce application program 116(1) or app a personal identification number (PIN) or other code for use in accessing the account. In the manner described above, since consumers can store certain personal and/or financial information via the mobile commerce application program 116(1) or app, consumers can readily register for multiple merchants' respective loyalty/reward programs, and in some instances, registration can be accomplished with a single click or authorization from the consumer 122(1).

After the consumer account has been configured, and the hosted website 134 or payment and rewards application program and/or mobile commerce application program 102 has stored information associated with the consumer account, the consumer 122(1) can utilize the account via a user interface provided by the consumer downloadable application program, mobile commerce application program 116(1) or app. The mobile commerce application program 116(1) or app can provide the consumer 122(1) with any number of tools to facilitate purchases, such as a payment button, a keypad, a voice input payment command, etc. In some embodiments, the consumer 122(1) can verify via the mobile commerce application program 116(1) or app a payment command or instruction by entering his or her PIN or other code. In any instance, after a successful transaction, the consumer 122(1) can be notified via the mobile commerce application program 116(1) or app that the payment has been completed and a certain number of rewards has been earned.

In one embodiment, the consumer, such as the consumer 122(1), can travel to the merchant, such as by motorized vehicle, and can place the order for products or services from the merchant in the drive-thru lane using a conventional drive-thru communication system. The consumer 122(1) can launch the mobile commerce application program 116(1) or app on the consumer's mobile device, such as the mobile device 120(1), or phone or other client device by selecting the button associated with the mobile commerce application program 116(1) or app on the display of the mobile device 120(1), phone or other client device and can initiate a request to "check-in" at the merchant via a location based service, such as 144(1) associated with the consumer's mobile device 120(1). In some embodiments, a relatively prominent or large code, such as a QR code, can be displayed at the merchant location, such as code 138 at merchant location 136, such that the consumer 122(1) can readily identify the code 138 and scan the code 138 from his or her motorized vehicle. The consumer 122(1) may launch the mobile commerce application program 116(1) or app on the consumer's mobile device, such as the mobile device 120(1), or phone or other client device by scanning the code 138 or taking a picture of the code 138 with the consumer's mobile device 120(1). In any instance, the consumer's mobile device 120(1) or other client device can communicate with a host or server device, such as the server transaction processing system 106, via at least one network, such as the network(s) 126, the name or other identifying information of the consumer 122(1), such as a phone number or code, and the location of the consumer 122(1). Using the information, the host or server device 106 can identify the consumer 122(1), the merchant, the merchant's payment and loyalty-reward program. In some instances, when the consumer 122(1) arrives on the merchant's property, a notification can be triggered automatically via a location-based service, such as 144(1), associated with the consumer's mobile device 120(1). The notification can be communicated by the consumer's mobile device 120(1) or other client device to the host or server device 106 via at least one network 126. The check-in request or automatic notification can be communicated to the merchant. For example, the host or server device 106 can communicate the information to a merchant computer system, such as the merchant system computer 112, and/or merchant computer device, such as the merchant system device 114, or merchant's point-of-sale (POS) device. The information can include the name or other identifying information of the consumer 122(1). The information can also include the time the information was communicated to either the host or server device 106, or the merchant computer system 112 and/or merchant computer device 114, such as a POS device.

Once the consumer 122(1) has finished making an order, the consumer 122(1) can proceed to the pickup window, payment window, or other location provided by the merchant for payment of the transaction associated with the goods and/or services ordered. The merchant or merchant's employee can request information from the consumer 122(1). The information can include whether the consumer 122(1) has checked-in at the merchant, all or a portion of the consumer's name, the consumer's phone number, or a code that is provided when the consumer 122(1) checks-in and is associated with the consumer's name. The merchant or merchant's employee can check a merchant computer system 112 and/or merchant computer device 114, such as a POS device, to see if the information provided by the consumer 122(1), such as the consumer's name, is identified as being checked in and can associate the consumer's information with the consumer's order of goods and/or services.

Once the consumer 122(1) is associated with the transaction the merchant computer system 112 and/or merchant computer device 114, such as a POS device, can communicate information to the host or server device 106 associated with the transaction. The information can include the name or other identifying information for the consumer 122(1), the merchant, and the amount to be charged to the consumer for the transaction. Based on the received information the host or server device 106 can communicate the information to the consumer's mobile device 120(1), phone or other client device. The mobile commerce application program 116(1) or app can receive the information and can initiate a display of the amount to be charged for the transaction on the display screen of the consumer's mobile phone 120(1) or other client device. The consumer 122(1) can select the payment method to be used for payment of this transaction. For example, the consumer 122(1) can manually select an icon presented on the touch-enabled display screen of the consumer's mobile device 120(1), phone or other client device that is associated with the payment method desired by the consumer 122(1). In one example, the payment method can be one of the payment methods that the consumer 122(1) has pre-registered with the mobile commerce application program 116(1) or app.

The consumer 122(1) can confirm the transaction and/or the amount or the transaction by manually selecting an icon presented on the touch-enabled display screen of the consumer's mobile device 120(1), phone or other client device. The consumer's mobile device 120(1), phone or other client device can communicate with the host or server device 106 and can transmit the payment method selected by the consumer 122(1) along with other information identifying the consumer 122(1), the transaction, and, optionally, the merchant. The host or server 106 can verify payment and can communicate with the merchant computer system 112 and/or merchant computer device 114, such as a POS device, at the merchant to notify the merchant that the transaction has been paid. The merchant computer system 112 and/or merchant computer device 114, such as a POS device of the merchant, can transmit an electronic receipt for the transaction to the customer's mobile device 120(1), phone or other client device by way of the host or server device 106. In addition, a physical receipt can be printed out at the merchant and given to the consumer 122(1).

After a successful transaction, the consumer 122(1) can be notified via the mobile commerce application program 116(1) or app that payment has been completed and a certain number of rewards has been earned. For example, in certain embodiments, purchase or loyalty rewards can be provided to the consumer 122(1) by way of the mobile commerce application program 116(1) or app for certain predefined purchases or purchase levels. Once the purchase has been completed, the consumer 122(1) can receive the purchased goods and/or services and leave the merchant's location, such as 136.

In another embodiment, the consumer 122(1) can travel to the merchant and places the order for products or services from the merchant in the drive-thru lane using a conventional drive-thru communication system. At some point while making the order, the merchant's employee can communicate to the consumer 122(1) a transaction code to associate with the transaction over the conventional drive-thru communication system. For example the employee can provide an order number to the consumer associated with the transaction.

The consumer 122(1) can launch the mobile commerce application program 116(1) or app on the consumer's mobile device 120(1), phone or other client device by selecting the mobile commerce application program 116(1) or app and can initiate a request to "check-in" at the merchant via a location based service, such as 144, associated with the consumer's mobile device 120(1). In some embodiments, a relatively prominent or large code, such as a QR code, can be displayed at the merchant location, such as code 138 at merchant location 136, such that the consumer 122(1) can readily identify the code 138 and scan the code 138 from his or her motorized vehicle. The consumer 122(1) may launch the mobile commerce application program 116(1) or app on the consumer's mobile device, such as the mobile device 120(1), or phone or other client device by scanning the code 138 or taking a picture of the code 138 with the consumer's mobile device 120(1). In any instance, the consumer's mobile device 120(1), phone or other client device can communicate with the host or server device 106 via at least one network 126, the name or other identifying information of the consumer 122(1), such as a phone number or PIN code, and the location of the consumer 122(1). Using the information, the host or server device 106 can identify the consumer 122(1), the merchant, and the merchant's payment and loyalty-reward program. In some instances, when the consumer 122(1) arrives on the merchant's property, a notification can be triggered automatically via a location-based service, such as 144(1) associated with the consumer's mobile device 120(1). The notification can be communicated by the consumer's mobile device 120(1), phone, or other client device to the host or server device 106 via at least one network 126. The check-in request or automatic notification can be communicated to the merchant. For example, the host or server device 106 can communicate the information to a merchant computer system 112 and/or merchant computer device 114, such as a merchant's point-of-sale (POS) device. The information can include the name or other identifying information of the consumer 122(1). The information can also include the time the information was communicated to either the host or server device 106, or the merchant computer system 112 and/or merchant computer device 114, such as a POS device.

The consumer 122(1) can enter the transaction code into the user interface generated by the mobile commerce application program 116(1) or app executing on the consumer's mobile device 120(1), phone or other client device. The transaction code along with information identifying the consumer 122(1) can be transmitted from the consumer's mobile device 120(1), phone or other client device to the host or server device 106 and then to the merchant, for example the merchant computer system 112 and/or merchant computer device 114, such as the merchant's POS system. In certain embodiments, only the transaction code is transmitted form the host or server device 106 to the merchant. The merchant computer system 112 and/or merchant computer device 114, such as the POS system, can associate the received transaction code with an amount for the transaction. The transaction amount and the transaction code can be communicated from the merchant to the host or server device 106, such as by using the merchant computer system 112 and/or merchant computer device 114, such as the POS system, and then from the host or server device 106 to the consumer's mobile device 120(1), phone or other client device. The mobile commerce application program 116(1) or app can display the received transaction amount on the display of the consumer's mobile device 120(1), phone or other client device.

The consumer 122(1) can view the transaction amount on the consumer's mobile device 120(1), phone or other client device and can select the payment method to be used for payment of this transaction. For example, the consumer 122(1) can manually select an icon presented on the touch-enabled display screen of the consumer's mobile device 120(1), phone or other client device that is associated with the payment method desired by the consumer 122(1). In one example, the payment method can be one of the payment methods that the consumer 122(1) has pre-registered with the mobile commerce application program 116(1) or app. The consumer 122(1) can confirm the transaction and/or the amount or the transaction by manually selecting an icon presented on the touch-enabled display screen of the consumer's mobile device 120(1), phone or other client device. The consumer's mobile device 120(1), phone or other client device can communicate with the host or server device 106 and can transmit the payment method selected by the consumer 122(1) along with other information identifying the consumer 122(1), the transaction, and, optionally, the merchant. The host or server 106 can verify payment and can communicate with the merchant computer system 112 and/or merchant computer device 114, such as the POS device, at the merchant to notify the merchant that the transaction has been paid. The merchant computer system 112 and/or merchant computer device 114, such as the POS device of the merchant, can transmit an electronic receipt for the transaction to the customer's mobile device 120(1), phone or other client device by way of the host or server device 106.

After a successful transaction, the consumer 122(1) can be notified via the mobile commerce application program 116(1) or app that payment has been completed and a certain number of rewards has been earned. For example, in certain embodiments, purchase or loyalty rewards can be provided to the consumer 122(1) by way the mobile commerce application program 116(1) or app for certain predefined purchases or purchase levels. The consumer 122(1) can proceed to the pickup window, payment window, or other location provided by the merchant to receive the goods and/or services ordered. In addition, a physical receipt can be printed out at the merchant and given to the consumer 122(1). Once the purchase has been completed, the consumer 122(1) can receive the purchased goods and/or services and leave the merchant's location, such as 136.

In addition to the methods described above, in certain embodiments, the merchant can provide a coupon or other offer associated with a transaction at the merchant. The offer can be an electronic offer, such as an offer in an Internet advertisement or an email offer, or the offer can be in physical form and associated with a website, such as the one or more websites 134, accessible by the consumer 122(1). In either case, the consumer 122(1) can transmit the merchant's offer from one digital medium to the consumer's mobile device 120(1), phone or other client device and associate the offer with the transaction at the merchant. For example, the offer can be transmitted with the consumer's information from the consumer's mobile device 120(1), phone or other client device when the consumer checks-in to the merchant. The host or server device 106 can transmit information about the offer to the merchant at the merchant computer system 112 and/or merchant computer device 114, such as the POS device in order to deduct the amount of the offer from the transaction amount if the transaction satisfies the offer requirements.

FIGS. 12-15 illustrate example methods for drive-thru payment programs for products and services without the need for near-field communication or QR codes, and implemented on a consumer's mobile phone or other client device according to certain embodiments of the disclosure. Various operations of the methods described below can be performed by the system components described above and shown in FIGS. 1 and 2.

Figure 12:
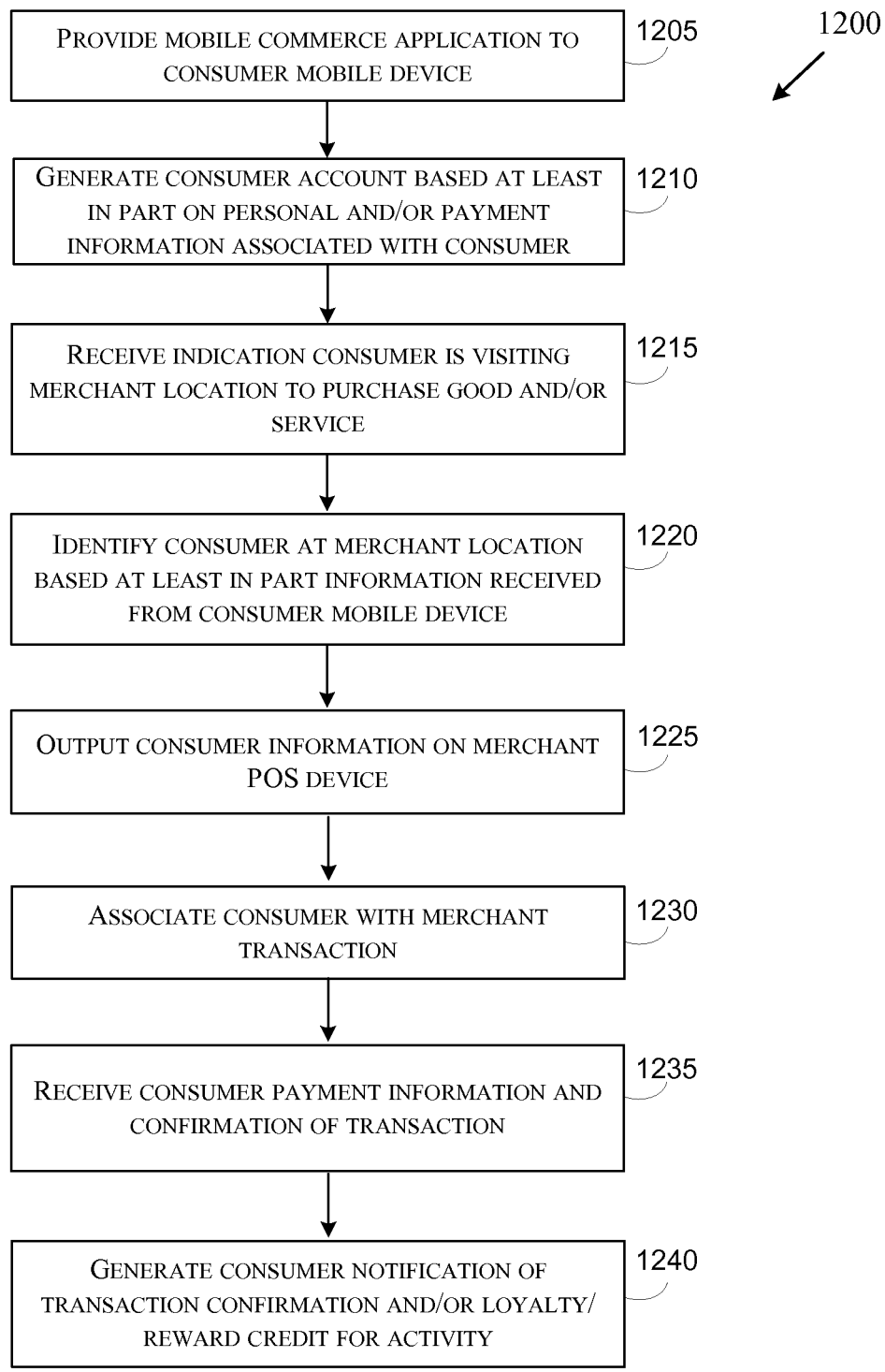

FIG. 12 illustrates an example method 1200 according to an embodiment of the disclosure. The method 1200 describes a check in to pay at a quick service restaurant window transaction. The method 1200 begins at block 1205, in which a mobile commerce program application can be provided to a consumer's mobile device. Block 1205 is followed by block 1210, in which a consumer account can be generated based at least in part on personal and/or payment information associated with the consumer. Block 1210 is followed by block 1215, in which an indication can be received the consumer is visiting a merchant location to purchase a good and/or service. Block 1215 is followed by block 1220, in which a consumer can be identified at the merchant location based at least in part on information received from the consumer's mobile device. Block 1220 is followed by block 1225, in which consumer information can be output to a merchant computer system and/or merchant computer device, such as a POS device. Block 1225 is followed by block 1230, in which the consumer can be associated with the merchant transaction. Block 1230 is followed by block 1235, in which consumer payment information and consumer confirmation of the transaction can be received. Block 1235 is followed by block 1240, in which a consumer notification of the transaction and/or of any loyalty/reward credit for the activity can be generated. The method 1200 can end after block 1240.

Figure 13:
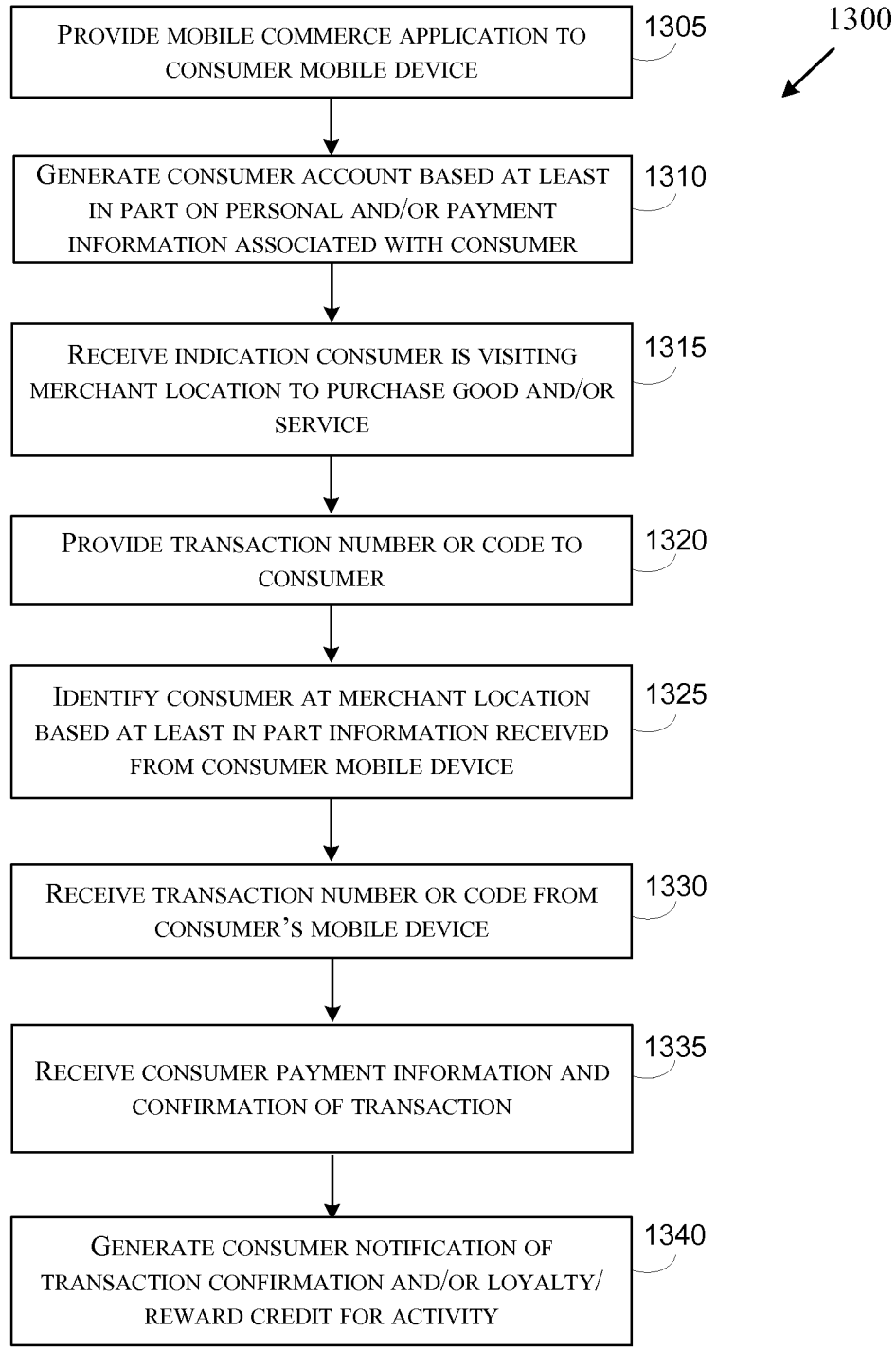

FIG. 13 illustrates an example method 1300 according to an embodiment of the disclosure. The method 1300 describes a check in to pay in a quick service restaurant drive thru line transaction. The method 1300 begins at block 1305, in which a mobile commerce program application can be provided to a consumer's mobile device. Block 1305 is followed by block 1310, in which a consumer account can be generated based at least in part on personal and/or payment information associated with the consumer. Block 1310 is followed by block 1315, in which an indication can be received the consumer is visiting a merchant location to purchase a good and/or service. Block 1315 is followed by block 1320, in which a transaction number or code can be provided to the consumer. Block 1320 is followed by block 1325, in which a consumer can be identified at the merchant location based at least in part on information received from the consumer's mobile device. Block 1325 is followed by block 1330, in which the transaction number or code can be received from the consumer. Block 1330 is followed by block 1335, in which the consumer payment information and consumer confirmation of the transaction can be received. Block 1335 is followed by block 1340, in which a consumer notification of the transaction and/or of any loyalty/reward credit for the activity can be generated. The method 1300 can end after block 1340.

Figure 14:
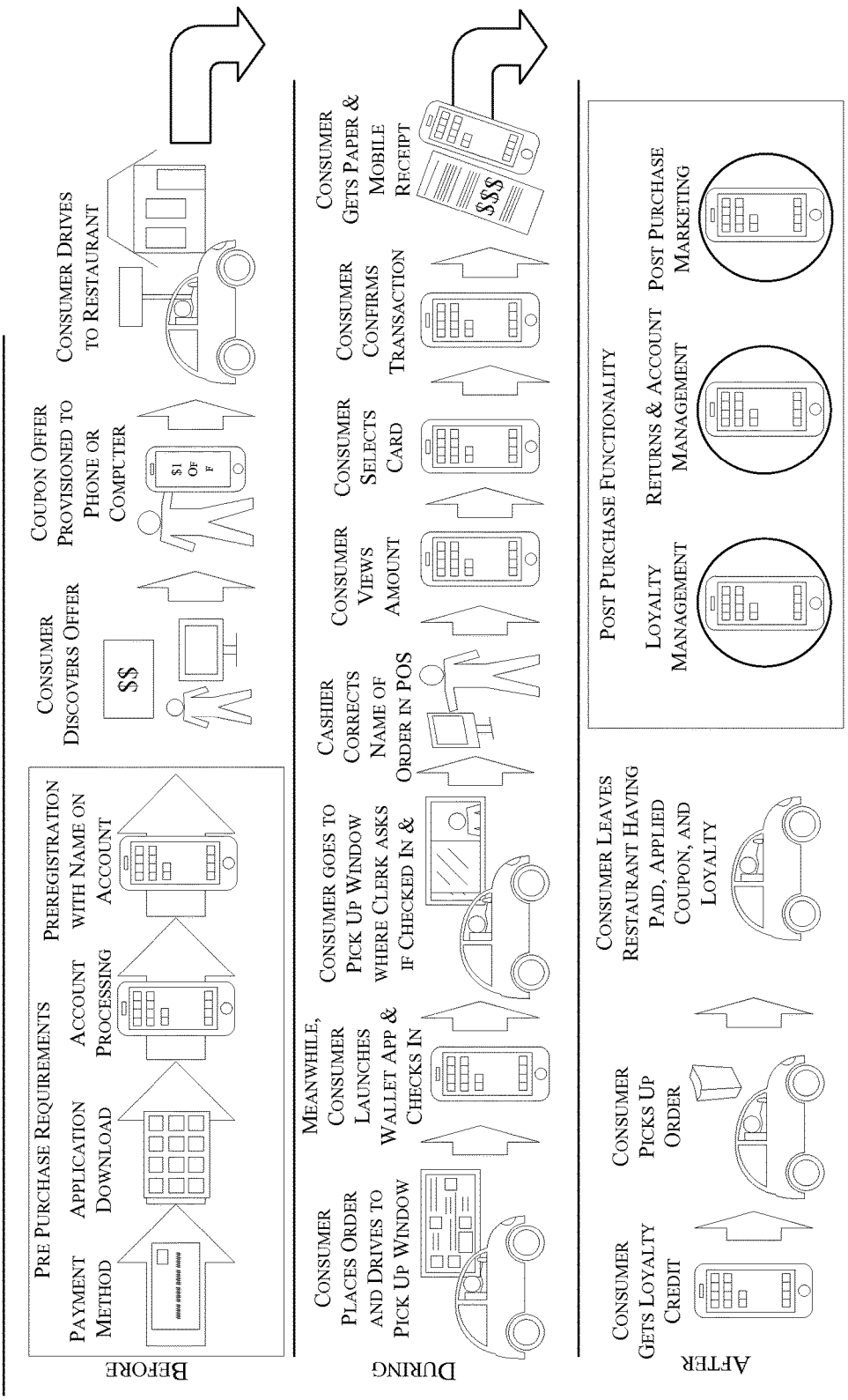

FIG. 14 illustrates an example method 1400 according to an embodiment of the disclosure. For example, the method 1400 describes a check in to pay at a quick service restaurant window transaction. In a first instance, prior to a purchase transaction, a payment device can be issued to a consumer. The consumer can download a mobile commerce application program to an associated mobile device. An account associated with the consumer can be provisioned via the mobile commerce application program. The consumer can pre-register using at least his or her name associated with the account. The consumer can be presented with an offer, such as online or an advertisement for $1 off a restaurant item. A coupon and/or offer can be transmitted or otherwise accessed via the consumer's mobile device. The consumer can go to a merchant location associated with the offer, such as to a restaurant location.

In a second instance, the consumer can place an order for the restaurant item that is subject to the offer, and then go to a pick-up window at the merchant location or restaurant. The consumer can launch the mobile commerce application program on his or her mobile device, and check in via the application program. The consumer can arrive at the pick-up window, where the merchant can confirm the consumer is checked in via the application program. The merchant can associate the consumer's name to the order in a merchant computer system and/or merchant computer device, such as a POS device. The consumer can view a total bill amount via the mobile device. The consumer can select via the mobile device a payment device, such as a payment card, to pay the total bill amount. After selecting the payment device, the consumer can confirm the transaction via the mobile device. The consumer can receive a paper receipt from the merchant and also receive an electronic receipt via the mobile device.

In a third instance, the consumer can receive loyalty/reward credit allocated to the consumer's account. The consumer can pick up his or her order from the merchant. The consumer can depart the merchant location having paid for the transaction, applied the offer, and received loyalty/reward credit for the transaction, redemption of the offer, and/or visit to the merchant. The method 1400 can then end.

Figure 15:
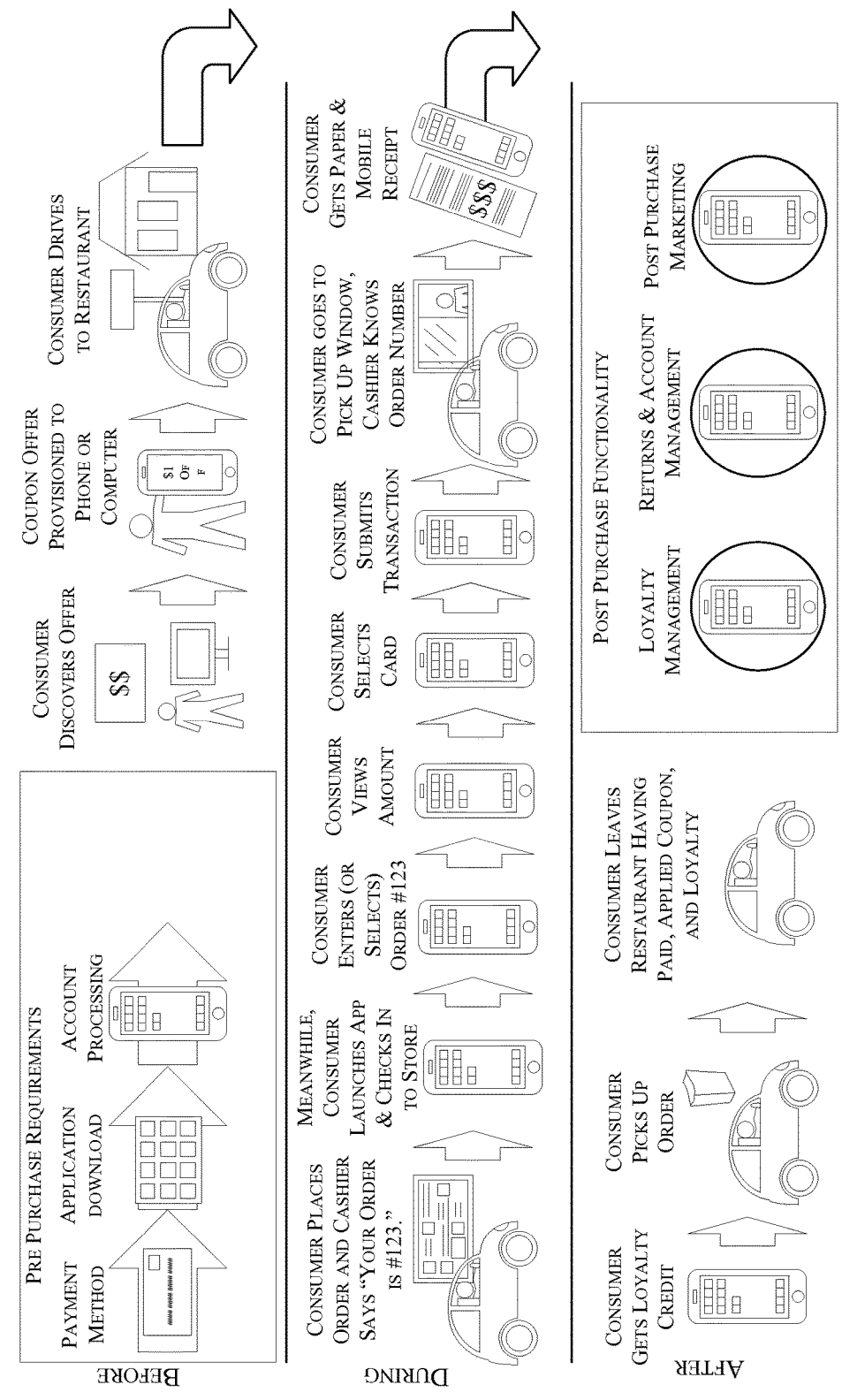

FIG. 15 illustrates an example method 1500 according to an embodiment of the disclosure. For example, the method 1500 describes a check in to pay in a quick service restaurant drive thru line transaction. In a first instance, prior to a purchase transaction, a payment device can be issued to a consumer. The consumer can download a mobile commerce application program to an associated mobile device. An account associated with the consumer can be provisioned via the mobile commerce application program. The consumer can pre-register using at least his or her name associated with the account. The consumer can be presented with an offer, such as online or an advertisement for $1 off a restaurant item. A coupon and/or offer can be transmitted or otherwise accessed via the consumer's mobile device. The consumer can go to a merchant location associated with the offer, such as to a restaurant location.

In a second instance, the consumer can place an order for the restaurant item that is subject to the offer, and then receive an order number or code at the merchant location or restaurant. The consumer can launch the mobile commerce application program on his or her mobile device, and check in via the application program. The consumer can, via the mobile device, enter the order number or code, view the transaction amount, select a payment device, such as a payment card, and submit the transaction. The consumer can arrive at the pick-up window, where the merchant can confirm the transaction is paid for via a merchant computer system and/or merchant computer device, such as a POS device. The consumer can receive a paper receipt from the merchant and also receive an electronic receipt via the mobile device.

In a third instance, the consumer can receive loyalty/reward credit allocated to the consumer's account. The consumer can pick up his or her order from the merchant. The consumer can depart the merchant location having paid for the transaction, applied the offer, and received loyalty/reward credit for the transaction, redemption of the offer, and/or visit to the merchant. The method 1500 can then end.

Using some or all of the above systems and processes, a technical solution facilitating bill payment functionality in mobile commerce can be enabled. For example, technical solutions involving a drive-thru payment program for products and services without the need for near-field communication or QR codes can be implemented. In this manner, technical solutions can be implemented for mobile devices that may not have or need near-field communication and/or QR code scanning capabilities.

The above methods of FIGS. 3-15 can be implemented with some or all of the system embodiments of the disclosure, such as FIGS. 1 and 2. One will recognize the applicability of various embodiments of the example system to implement the mobile commerce processes described above. The systems and methods disclosed herein are by way of example only, and other systems and methods in accordance with embodiments of the disclosure can include other components, operations, elements or steps, including fewer or greater numbers of components, elements, operations, or steps than the example systems and methods described herein as well as various combinations of these or other components, operations, elements or steps.

Figure 16:
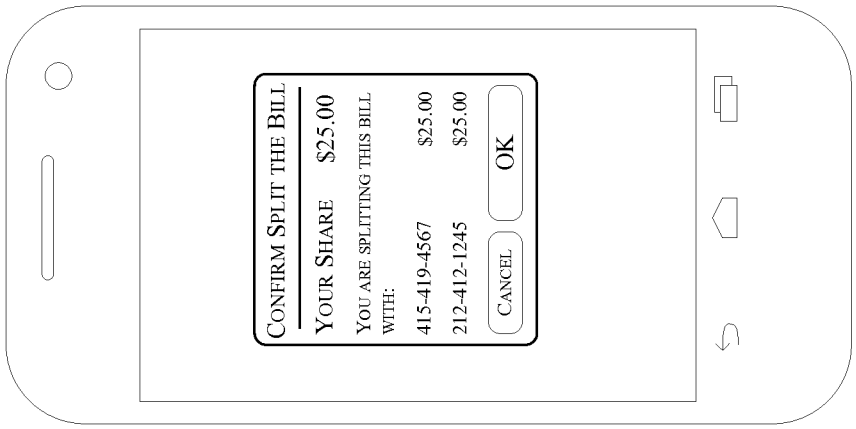
FIG. 16 illustrates example user interfaces for implementing certain systems and methods for facilitating bill payment functionality in mobile commerce according to certain embodiments of the disclosure.
Figure 16:
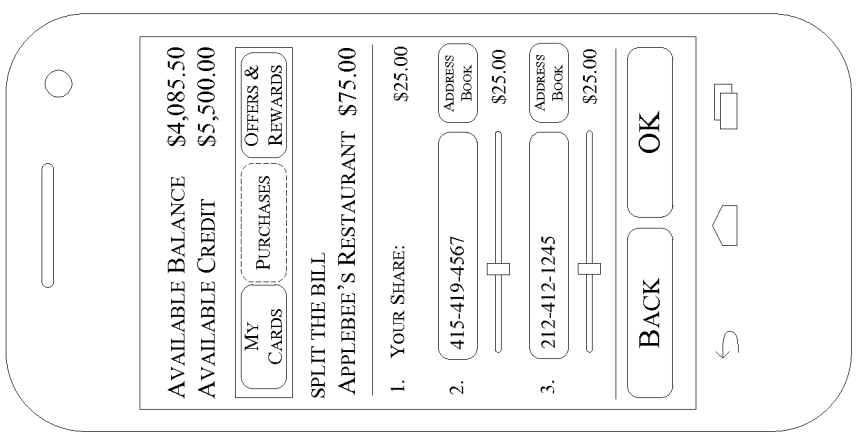
Figure 16:
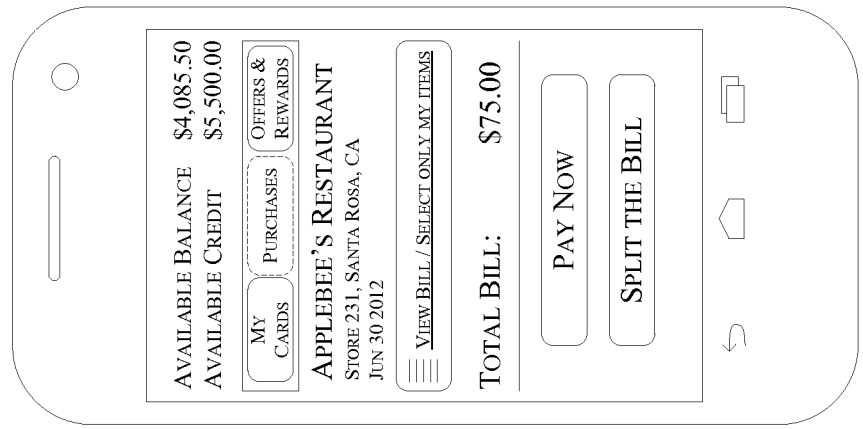

FIG. 16 illustrates example user interfaces for implementing certain systems and methods for facilitating bill payment functionality in mobile commerce according to certain embodiments of the disclosure, such as for splitting a bill among multiple consumers. For example, some or all of the user interfaces can be used to implement the system and system components shown and described with respect to FIGS. 1 and 2, and the methods shown and described with respect to FIGS. 3-15.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed The computer-executable program instructions described herein may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method of paying a bill from a consumer's mobile device, the method comprising:
receiving, by the mobile device, a transaction code for a transaction associated with a bill for a bill amount;
identifying, by the mobile device, consumer information associated with the transaction;
transmitting, by the mobile device and to the merchant device, the transaction code and the consumer information associated with the transaction, wherein the merchant device is configured to use the transaction code to identify transaction information comprising the bill amount for the transaction;
receiving, by the mobile device and from the merchant device, the transaction information comprising the bill amount for the transaction;
displaying, by the mobile device, the transaction information;
receiving, by the mobile device, via user input at the mobile device an indication from a consumer to split the bill among two or more consumers;
transmitting, by the mobile device to the merchant device, the indication to split the bill among the two or more consumers;
displaying, by the mobile device, at least one payment option that is user selectable, wherein each of the at least one payment option is configured to facilitate a payment of at least a portion of the bill amount and wherein said at least one payment option is one of a credit card, a debit card, a checking account, or a savings account;
receiving, by the mobile device, a user selection of one of the at least one payment option;
retrieving, by the mobile device from memory on the mobile device and based on the user selection of the at least one payment option, a payment authorization token identifying the selected one of the at least one payment option, wherein the payment authorization token provides access to the selected one of the at least one payment option at a server device separate from the mobile device and wherein the selected one of the at least one payment option is one of a credit card, a debit card, a checking account, or a savings account;
transmitting, by the mobile device, the retrieved payment authorization token identifying the selected one of the at least one payment option and the transaction information comprising the bill amount for approval of the payment of at least a portion of the bill amount associated with the selected one of the at least one payment option;
receiving, by the mobile device, a notification of approval of the payment of the at least a portion of the bill amount; and
receiving, by the mobile device, a payment completion code, wherein the payment completion code can be used to verify payment of the at least a portion of the bill amount.

2. The method of claim 1, further comprising:
providing a mobile commerce program application to the consumer's mobile device; and
generating a consumer account based at least in part on personal and/or payment information associated with the consumer.

3. The method of claim 1, further comprising:
receiving a coupon for the transaction, the coupon comprising a coupon amount; and
transmitting, by the mobile device, the coupon with the selected payment option and transaction information for approval of the payment of at least a portion of the bill amount associated with the selected payment option,
wherein the notification of approval of the payment of the at least a portion of the bill amount indicates that the bill amount is reduced by the coupon amount.

4. The method of claim 1, wherein the transaction code comprises at least one of the following: an alphanumeric string, a QR code, a bar code, or a unique number.

5. The method of claim 1, further comprising:
receiving the bill to be split among two or more consumers;
receiving inputs associated with a number of people to split the bill among, tip amount, and identifying other consumers and/or contact information for the other consumers;
receiving payment instructions from the other consumers;
based at least in part on the inputs and/or payment instructions, facilitate payment processing of the bill among the two or more consumers;
providing payment confirmation requests and/or payment notifications to one or more of the consumers; and
providing payment confirmation notification to a merchant.

6. The method of claim 1, further comprising:
receiving the bill to be split among the two or more consumers;
providing a list of items from the bill to each of the consumers;
receiving inputs from the consumers selecting one or more items to pay for;
receiving payment instructions for the consumers selecting one or more items to pay for;
calculating a total bill and/or tip for each consumer;
receiving payment instructions from the consumers;
facilitating payment processing of the bill among two or more consumers;
providing payment confirmation requests and/or payment notifications to two or more consumers; and
providing payment confirmation notification to a merchant.

7. The method of claim 1, further comprising:
transmitting the bill to a split-the-bill application program;
receiving notification concerning unpaid amounts, items, and/or payment disputes by one or more consumers; and
receiving payment confirmation of the bill from the split-the-bill application program.

8. A system for code-based payment from a consumer's mobile device, the system comprising:
at least one processor operable to execute computer-executable instructions; and
at least one memory operable to store computer-executable instructions to:
receive a transaction code for a transaction associated with a bill amount;
identify consumer information associated with the transaction;
communicate, to the merchant device, the transaction code and the consumer information associated with the transaction, wherein the merchant device is configured to identify transaction information comprising the bill amount for the transaction using the transaction code;
receive, from the merchant device, the transaction information comprising the bill amount for the transaction;
display the transaction information;
receive, via user input at a mobile device, an indication from a consumer to split the bill among two or more consumers;
communicate, to the merchant device, the indication to split the bill among the two or more consumers;
display at least one payment option that is user selectable, wherein each of the at least one payment option is configured to facilitate a payment of at least a portion of the bill amount and wherein said at least one payment option is one of a credit card, a debit card, a checking account, or a savings account;
receive a user selection of one of the at least one payment option;
retrieve, from the at least one memory and based on the user selection of the at least one payment option, a payment authorization token identifying the selected one of the at least one payment option, wherein the payment authorization token provides access to the selected one of the at least one payment option at a server device separate from the mobile device and wherein the selected one of the at least one payment option is one of a credit card, a debit card, a checking account, or a savings account;
communicate the payment authorization token identifying the selected one of the at least one payment option and the transaction information comprising the bill amount for approval of the payment of at least a portion of the bill amount associated with the selected one of the at least one payment option;
receive a notification of approval of the payment of the at least a portion of the bill amount; and
receive a payment completion code associated with the notification of approval, wherein the payment completion code can be used to verify payment of the at least a portion of the bill amount.

9. The system of claim 8, wherein the computer-executable instructions are further operable to:
provide a mobile commerce program application to the consumer's mobile device; and
generate a consumer account based at least in part on personal and/or payment information associated with the consumer.

10. The system of claim 8, wherein the computer-executable instructions are further operable to:
receive a coupon for the transaction, the coupon comprising a coupon amount; and
transmit the coupon with the selected payment option and transaction information for approval of the payment of at least a portion of the bill amount associated with the selected payment option,
wherein the notification of approval of the payment of the at least a portion of the bill amount indicates that the bill amount is reduced by the coupon amount.

11. The system of claim 8, wherein the transaction code comprises at least one of the following: an alphanumeric string, a QR code, a bar code, or a unique number.

12. The system of claim 8, wherein the computer-executable instructions are further operable to:
receive the bill to be split among two or more consumers;

receive inputs associated with a number of people to split the bill among, tip amount, and identifying other consumers and/or contact information for the other consumers;

receive payment instructions from the other consumers;

based at least in part on the inputs and/or payment instructions, facilitate payment processing of the bill among the two or more consumers;

provide payment confirmation requests and/or payment notifications to one or more of the consumers; and provide payment confirmation notification to a merchant.

13. The system of claim 8, wherein the computer-executable instructions are further operable to:

receive the bill to be split among the two or more consumers;

provide a list of items from the bill to each of the consumers;

receive inputs from the consumers selecting one or more items to pay for;

receive payment instructions for the consumers selecting one or more items to pay for;

calculate a total bill and/or tip for each consumer;

receive payment instructions from the consumers;

facilitate payment processing of the bill among two or more consumers;

provide payment confirmation requests and/or payment notifications to two or more consumers; and provide payment confirmation notification to a merchant.

14. The system of claim 8, wherein the computer-executable instructions are further operable to:

transmit the bill to a split-the-bill application program;

receive notification concerning unpaid amounts, items, and/or payment disputes by one or more consumers; and receive payment confirmation of the bill from the split-the-bill application program.

15. The method of claim 1, further comprising displaying to the consumer, by the mobile device, the payment completion code.

16. The system of claim 8, wherein the computer-executable instructions are further operable to:

display the payment completion code to the consumer.

17. The method of claim 1, wherein identifying, by the mobile device, consumer information associated with the transaction comprises:

retrieving, by the mobile device and from a memory of the mobile device, the consumer information.

* * * * *